(12) United States Patent
Doggett et al.

(10) Patent No.: US 10,569,415 B2
(45) Date of Patent: Feb. 25, 2020

(54) TENSION STIFFENED AND TENDON ACTUATED MANIPULATOR

(71) Applicant: U.S.A. as represented by the Administrator of the National Aeronautics and Space Administration, Washington, DC (US)

(72) Inventors: William R. Doggett, Poquoson, VA (US); John T. Dorsey, Hampton, VA (US); Thomas C. Jones, Newport News, VA (US); Bruce D. King, Yorktown, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 579 days.

(21) Appl. No.: 15/253,184

(22) Filed: Aug. 31, 2016

(65) Prior Publication Data
US 2018/0056510 A1    Mar. 1, 2018

(51) Int. Cl.
*B25J 9/00* (2006.01)
*B25J 9/10* (2006.01)
*B25J 9/06* (2006.01)
*B25J 18/00* (2006.01)

(52) U.S. Cl.
CPC .............. *B25J 9/1045* (2013.01); *B25J 9/06* (2013.01); *B25J 18/00* (2013.01)

(58) Field of Classification Search
CPC ............. B25J 9/1045; B25J 18/00; B25J 9/06
See application file for complete search history.

(56) References Cited

U.S. PATENT DOCUMENTS

| 1,106,029 | A | 8/1914 | Tull |
| 3,045,837 | A | 7/1962 | Liebherr et al. |
| 3,048,371 | A | 8/1962 | Klimek, Jr. |
| 3,083,837 | A | 4/1963 | Jones et al. |
| 3,134,488 | A | 5/1964 | Brekelbaum et al. |
| 3,198,345 | A | 8/1965 | Brekelbaum et al. |

(Continued)

FOREIGN PATENT DOCUMENTS

| DE | 7425234 | 9/1976 |
| DE | 3223169 | 12/1983 |

(Continued)

OTHER PUBLICATIONS

PCT International Search Report and Written Opinion, PCT/US13/24321, dated Apr. 22, 2013.

*Primary Examiner* — Victor L Macarthur
(74) *Attorney, Agent, or Firm* — M. Bruce Harper; Jonathan B. Soike; Robin W. Edwards

(57) ABSTRACT

A manipulator includes first and second link arms which are connected together by a hinge. A cable actuation and tensioning system is provided between the link arms and includes a spreader arm, a driven element attached to each link arm and a cable engaged with the respective driven element and attached to the spreader arm. At least one of the arms, or all of the arms, can telescope to shorten or lengthen the arm(s) by movement of the system. The spreader arm may also be configured to slide relative to the first and second link arms to change the position of the spreader arm relative to the first and second link arms.

21 Claims, 25 Drawing Sheets

(56) References Cited

U.S. PATENT DOCUMENTS

| | | | |
|---|---|---|---|
| 3,209,390 | A | 10/1965 | Bassan |
| 3,285,445 | A | 11/1966 | Broziat |
| 3,306,468 | A | 2/1967 | Pollak |
| 3,402,824 | A | 9/1968 | Zweifel |
| 3,433,368 | A | 3/1969 | Durand |
| 3,631,737 | A | 1/1972 | Wells |
| 3,685,668 | A | 8/1972 | Suverkrop |
| 4,068,827 | A | 1/1978 | Fanning et al. |
| 4,259,876 | A | 4/1981 | Belyanin et al. |
| 4,283,165 | A | 8/1981 | Vertut |
| 4,381,060 | A * | 4/1983 | Morrow, Sr. ........... B66C 23/82 212/195 |
| 4,383,616 | A | 5/1983 | Sterner et al. |
| 4,473,214 | A | 9/1984 | Sterner et al. |
| 4,529,094 | A | 7/1985 | Wadsworth |
| 4,738,583 | A | 4/1988 | Macconochie et al. |
| 4,826,087 | A | 5/1989 | Chinery |
| 4,925,039 | A | 5/1990 | Macris |
| 4,953,720 | A | 9/1990 | Okano et al. |
| 5,114,300 | A * | 5/1992 | Shahinpoor ........... E04B 1/3205 248/654 |
| 5,253,771 | A | 10/1993 | Mikulas, Jr. et al. |
| 5,263,809 | A | 11/1993 | Kent |
| 5,445,487 | A | 8/1995 | Koscinski, Jr. |
| 5,857,648 | A | 1/1999 | Dailey et al. |
| 6,280,358 | B1 | 8/2001 | Hormann |
| D467,403 | S | 12/2002 | Aquino |
| 6,499,610 | B2 | 12/2002 | Spitsbergen |
| 6,640,928 | B1 | 11/2003 | Ridley, Jr. |
| 6,655,539 | B2 | 12/2003 | Bertinotti |
| 6,669,038 | B1 | 12/2003 | Zingerman |
| 7,093,730 | B2 | 8/2006 | Saint-Gerand |
| 7,114,682 | B1 | 10/2006 | Kistler et al. |
| 7,172,385 | B2 * | 2/2007 | Khajepour ........... B25J 17/0266 414/735 |
| 7,216,774 | B2 | 5/2007 | Mizuta et al. |
| 7,367,771 | B2 * | 5/2008 | Khajepour ........... B25J 17/0266 414/735 |
| 7,367,772 | B2 * | 5/2008 | Khajepour ........... B25J 17/0266 414/735 |
| 7,617,943 | B2 | 11/2009 | Willim |
| 7,780,651 | B2 | 8/2010 | Madhani et al. |
| 7,878,348 | B2 | 2/2011 | Doggett et al. |
| 9,168,659 | B2 * | 10/2015 | Doggett ................... B25J 18/00 |
| 9,308,652 | B2 * | 4/2016 | Pehlivan ............ B25J 17/0266 |
| 10,195,749 | B2 * | 2/2019 | Doggett ................... B25J 18/00 |
| 2002/0023891 | A1 | 2/2002 | Verchere et al. |
| 2003/0160016 | A1 | 8/2003 | Ortiz et al. |
| 2003/0217985 | A1 | 11/2003 | Saint-Gerand |
| 2004/0026350 | A1 | 2/2004 | Yerly |
| 2004/0146388 | A1 * | 7/2004 | Khajepour ........... B25J 17/0266 414/680 |
| 2009/0134107 | A1 | 5/2009 | Doggett |
| 2010/0282702 | A1 | 11/2010 | Steindl |
| 2010/0294738 | A1 | 11/2010 | Martin |
| 2011/0024378 | A1 | 2/2011 | Pleuss et al. |
| 2011/0266508 | A1 | 11/2011 | Karguth et al. |
| 2013/0108405 | A1 | 5/2013 | Huissoon |
| 2013/0164107 | A1 * | 6/2013 | Pehlivan ............ B25J 17/0266 414/732 |
| 2013/0305867 | A1 * | 11/2013 | Doggett ................... B25J 18/00 74/490.04 |
| 2014/0083964 | A1 | 3/2014 | Kurotsu |
| 2014/0131300 | A1 | 5/2014 | Scampini |
| 2014/0202971 | A1 | 7/2014 | Bosco |
| 2016/0107321 | A1 * | 4/2016 | Doggett ................... B25J 18/00 74/490.05 |
| 2018/0056510 | A1 * | 3/2018 | Doggett ................ B25J 9/1045 |

FOREIGN PATENT DOCUMENTS

| | | |
|---|---|---|
| DE | 4403687 | 10/1995 |
| SU | 00504124 | 2/1976 |
| WO | 2007008187 | 1/2007 |

\* cited by examiner

TENSION STIFFENED AND TENDON ACTUATED MANIPULATOR

STATEMENT REGARDING FEDERALLY SPONSORED RESEARCH AND DEVELOPMENT

The invention described herein was made in the performance of work under a NASA contract and by employees of the United States Government and is subject to the provisions of the National Aeronautics and Space Act, Public Law 111-314, § 3 (124 Stat. 3330, 51 U.S.C. Chapter 201), and may be manufactured and used by or for the Government for governmental purposes without the payment of any royalties thereon or therefore.

BACKGROUND OF THE INVENTION

Space-based manipulators are known in the art. One such manipulator is provided in U.S. Pat. No. 9,168,659. U.S. Pat. No. 9,168,659 discloses a tension stiffened and tendon actuated manipulator for performing robotic-like movements when acquiring a payload. The manipulator design can be adapted for use in-space, lunar or other planetary installations as it is readily configurable for acquiring and precisely manipulating a payload in both a zero gravity ("zero-g") environment and in an environment with a gravity field. The manipulator includes a plurality of link arms, a hinge connecting adjacent link arms together to allow the adjacent link arms to rotate relative to each other and a cable actuation and tensioning system provided between adjacent link arms. The cable actuation and tensioning system includes a spreader arm and a plurality of driven and non-driven elements attached to the link arms and the spreader arm. At least one cable is routed around the driven and non-driven elements for actuating the hinge.

BRIEF SUMMARY OF THE INVENTION

A manipulator includes first and second link arms which are connected together by a hinge. A cable actuation and tensioning system is provided between the link arms and includes a spreader arm, a driven element attached to each link arm and a cable engaged with the respective driven element and attached to the spreader arm. At least one of the arms, or all of the arms, can telescope to shorten or lengthen the arm(s) by movement of the system. The spreader arm may also be configured to slide relative to the first and second link arms to change the position of the spreader arm relative to the first and second link arms.

These and other features, advantages, and objects of the present invention will be further understood and appreciated by those skilled in the art by reference to the following specification, claims, and appended drawings.

DETAILED DESCRIPTION OF THE INVENTION

Figure 2:
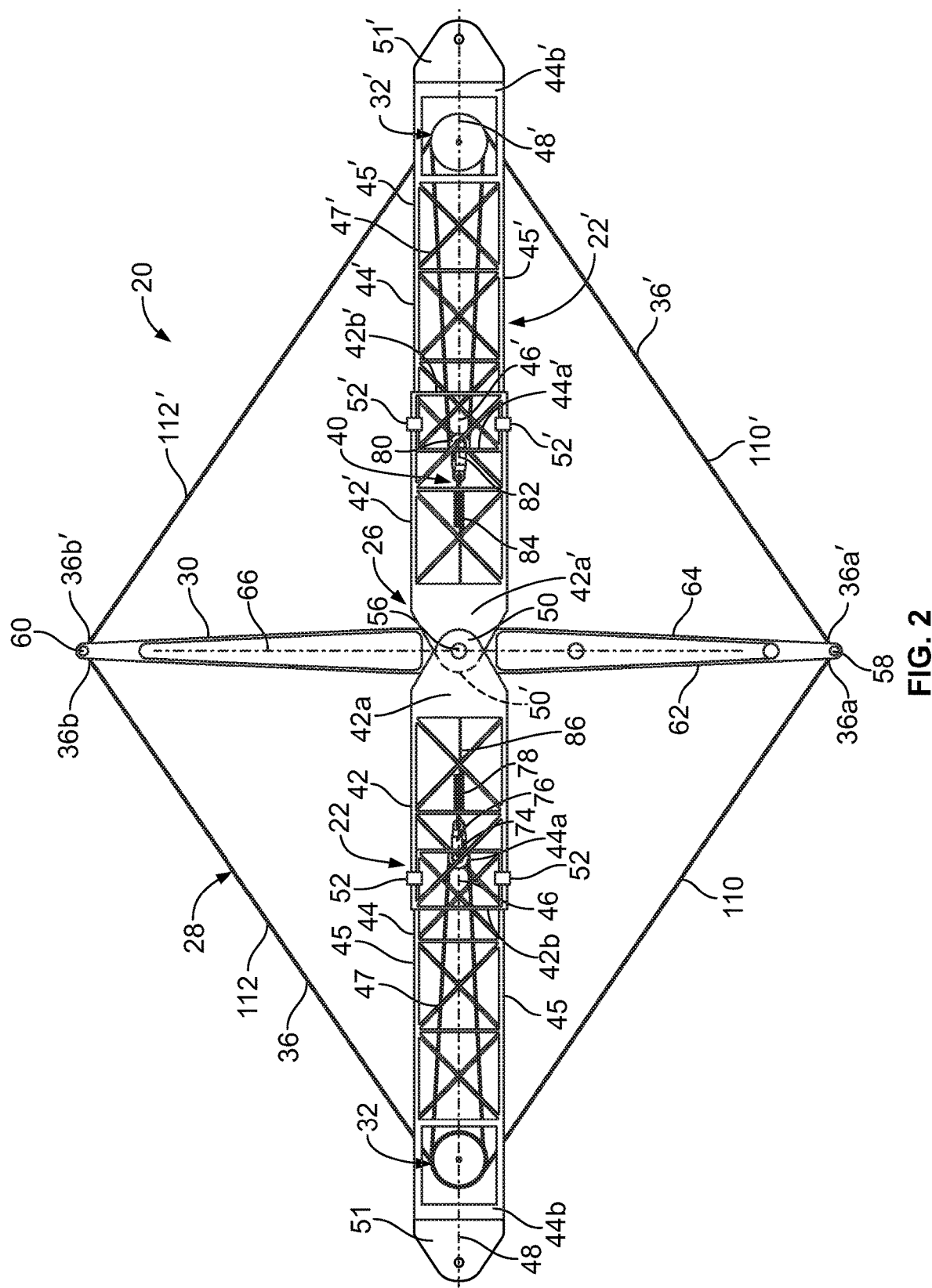
FIG. 2 is a side elevation view of the manipulator with link arms in an extended position.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
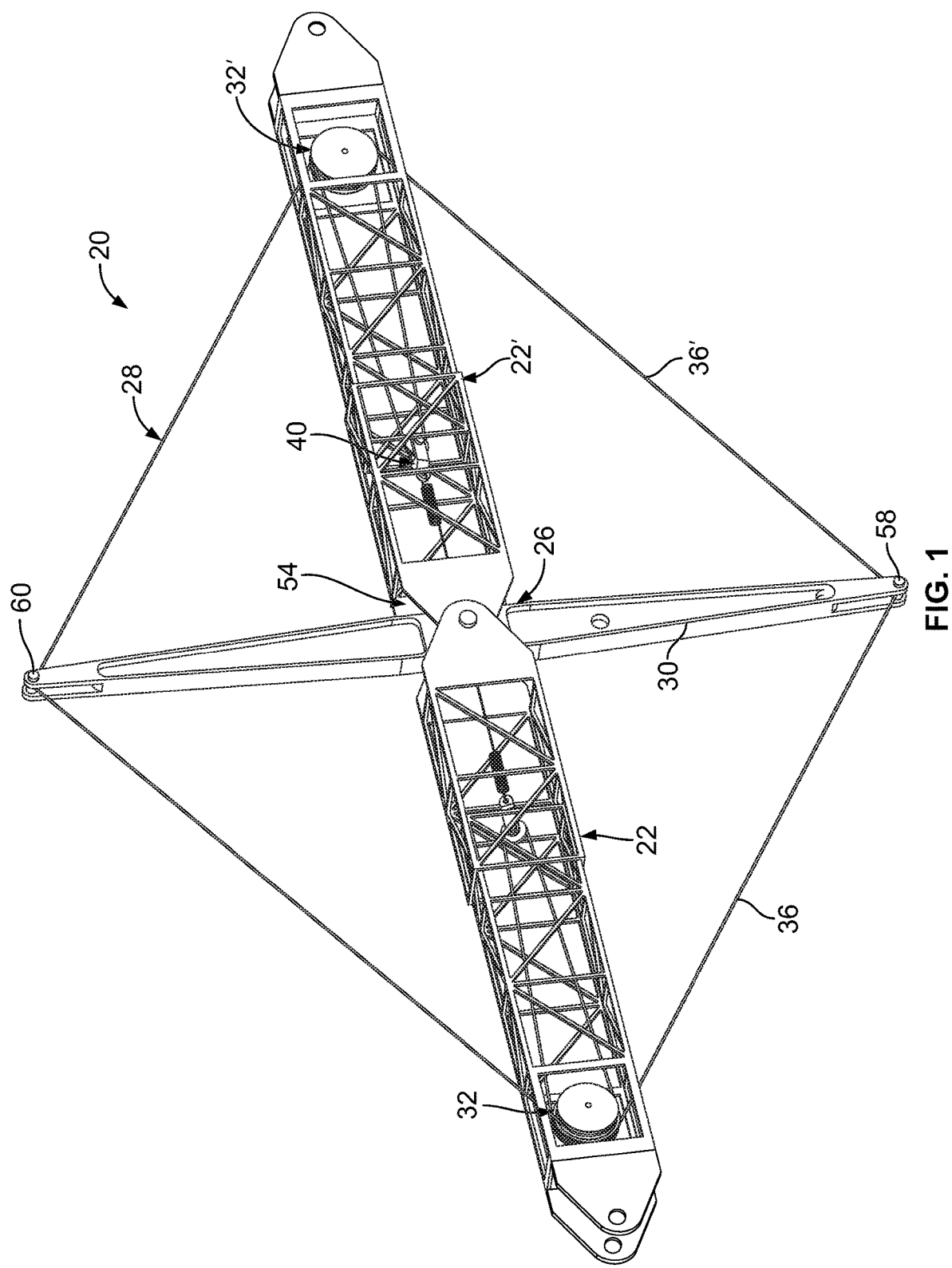
FIG. 1 is a perspective view of a manipulator in accordance with the present disclosure.
Figure 26:
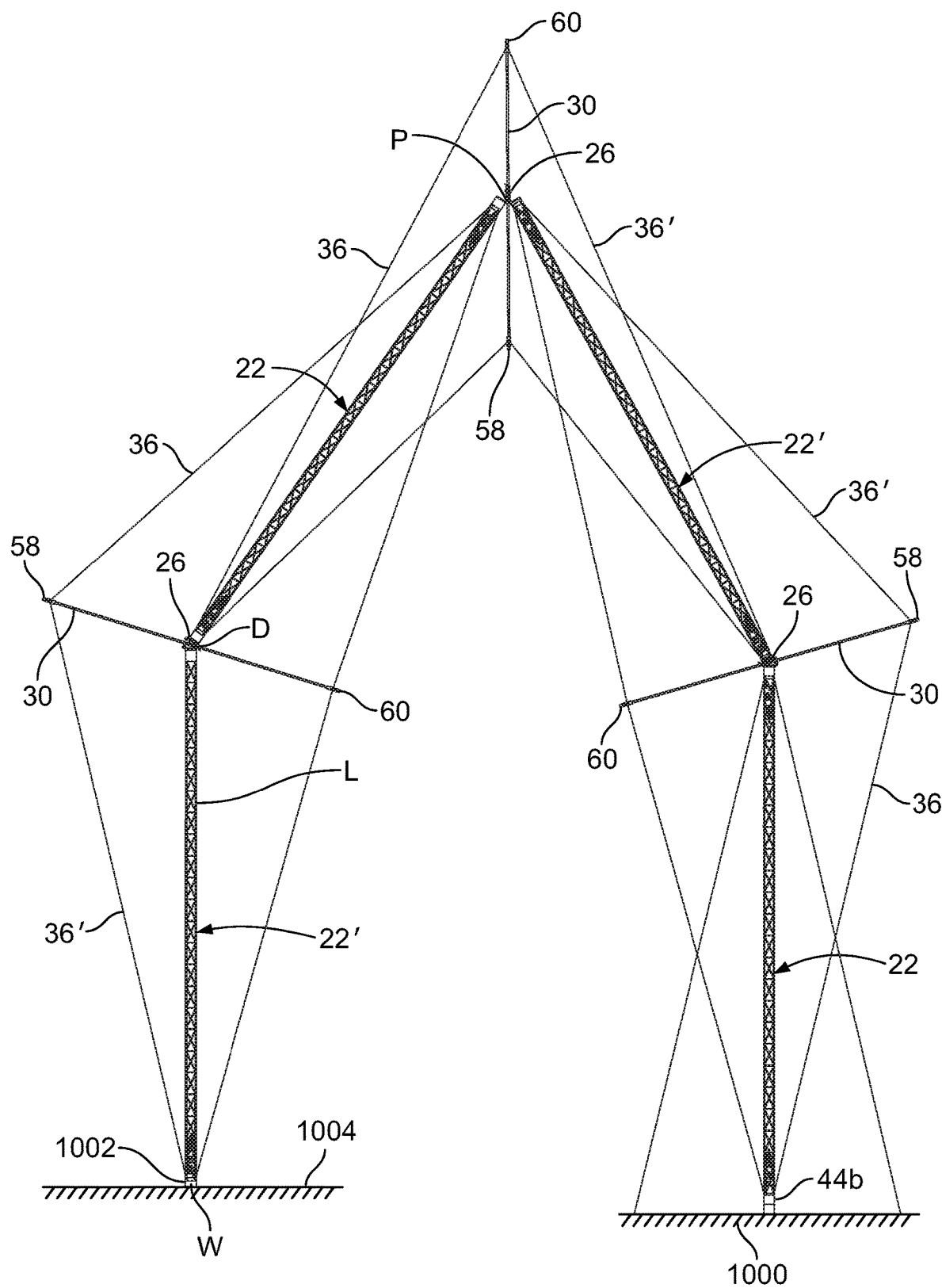
FIG. 26 is a side elevation view of the manipulator showing the extension of the arms in an example procedure for effecting same.

As shown in FIG. 1, a manipulator 20 has first and second link arms 22, 22' which are connected together by a hinge 26. The manipulator 20 further has a cable actuation and tensioning system 28 which actuates the hinge 26 and stiffens the structure of the manipulator 20 in a modular fashion. The cable actuation and tensioning system 28 includes a third arm 30, which is referred to as a spreader arm herein, extending through the hinge 26, a driven element assembly 32 attached to the link arm 22, a driven element assembly 32' attached to the link arm 22', a cable 36 attached to the spreader arm 30 and routed around the driven element assembly 32, a cable 36' attached to the spreader arm 30 and routed around the driven element assembly 32', and a cable management apparatus 40 attached to the cables 36, 36'. A pair of link arms 22, 22' and a single hinge 26, along with its cable actuation and tensioning system 28, are shown in the drawings for ease in description. It is to be understood that any number of link arms 22, 22' and hinges 26 and their associated cable actuation and tensioning system 28 as desired can be used (an example is shown in FIG. 26); as a result, the manipulator 20 is modular. Each hinge 26 provides a degree-of-freedom, such that as many degrees of freedom as required can be provided.

The manipulator 20 achieves both high structural performance, as well as high dexterity by combining a number of tendon-actuated hinges 26 with extendable-length link arms 22, 22' to form the manipulator 20. Each hinge 26 provides for relative motion between the link arms 22, 22' attached thereto. The manipulator 20 has long reach, high payload mass/tip force capability, high stiffness, precise positioning, system simplicity, and high reliability while also being lightweight and packaging efficiently. The cable actuation and tensioning system 28 increases the stiffness of the manipulator 20, without increasing tube diameter of the link arms 22, 22', thus still allowing for efficient packaging.

Link arm 22 is formed of inner and outer sections 42, 44 which are capable of telescoping relative to each other as described herein. Each section 42, 44 is an elongated, stiff member and may be formed as a truss. For example, each section 42, 44 may be formed of first and second walls 45 which are connected together by side walls 47 to form a box-like shape. The side walls 47 may be formed by a plurality of x-shaped braces. The inner section 42 has inner and outer ends 42a, 42b and a centerline 46 extends therebetween. The outer section 44 has inner and outer ends 44a, 44b and a centerline 48 extends therebetween. The centerlines 46, 48 align with each other. The inner end 42a of the inner section 42 has a pair of spaced apart ears 50 which form part of the hinge 26. As shown, the outer section 44 may be smaller than the inner section 42 so that the inner end 44a of the outer section 44 seats within the second end 42b of the inner section 42. Alternatively, the inner section 42 may be smaller than the outer section 44 so that the inner section 42 can seat within the outer section 44. Latches 52 are provided between the inner and outer sections 42, 44. When the latches 52 are engaged, the inner and outer sections 42, 44 cannot move relative to each other. When the latches 52 are disengaged, the outer section 44 can move relative to the inner section 42. The latches 52 are driven by a motor to latch and unlatch. The outer end 44b of the outer section 44 has a pair of spaced apart ears 51 which form part of the hinge with an adjacent link arm (not shown).

Link arm 22' is formed of inner and outer sections 42', 44' which are capable of telescoping relative to each other as described herein. Each section 42', 44' is an elongated, stiff member and may be formed as a truss. For example, each section 42', 44' may be formed of first and second walls 45' which are connected together by side walls 47' to form a box-like shape. The side walls 47' may be formed by a plurality of x-shaped braces. The inner section 42' has first and second ends 42a', 42b' and a centerline 46' extends therebetween. The outer section 44' has first and second ends 44a', 44b' and a centerline 48' extends therebetween. The centerlines 46', 48' align with each other. The inner end 42a' of the inner section 42' has a pair of spaced apart ears 50' which form part of the hinge 26. As shown, the outer section 44' may be smaller than the inner section 42' so that the inner end 44a' of the outer section 44' seats within the second end 42b' of the inner section 42'. Alternatively, the inner section 42' may be smaller than the outer section 44' so that the inner section 42' can seat within the outer section 44'. Latches 52' are provided between the inner and outer sections 42', 44'. When the latches 52' are engaged, the inner and outer sections 42', 44' cannot move relative to each other. When the latches 52' are disengaged, the outer section 44' can move relative to the inner section 42'. The latches 52' are driven by a motor to latch and unlatch. The outer end 44b' of the outer section 44' has a pair of spaced apart ears 51' which form part of the hinge with an adjacent link arm (not shown).

Each ear 50, 50' has an aperture therethrough which are aligned with each other. Ears 50 on link arm 22 may abut against respective ears 50' on link arm 22'. A spreader opening 54 is provided between the pairs of ears 50, 50' through which the spreader arm 30 is mounted. A pivot pin 56 extends through each set of ears 50, 50' such that the link arms 22, 22' can pivot relative to each other, yet maintain their attachment to each other; the pivot pin 56 forming part of the hinge 26. The link arms 22, 22' also pivot relative to the spreader arm 30 by the hinge 26. Accordingly, the pivot pin 56 define an axis of rotation for the adjacent link arms 22, 22'.

When the link arms 22, 22' are in a first position wherein the link arms 22, 22' are not pivoted relative to each other, the centerlines 46, 48, 46', 48' are aligned with each other to form a common centerline along the length of the manipulator 20. In this first position, the axis of rotation is perpendicular to the common centerline. The link arms 22, 22' may be moved to a variety of second positions wherein the link arms 22, 22' are pivoted relative to each other. In these second positions, the centerlines 46, 48 of link arm 22 are not aligned with the centerlines 46', 48' of link arm 22'; instead the centerlines 46, 48 of link arm 22 are at an angle relative to the centerlines 46', 48' of link arm 22'.

The cable actuation and tensioning system 28 includes the spreader arm 30, the driven element assemblies 32, 32' attached to the respective link arms 22, 22', the pair of cables 36, 36' attached to the spreader arm 30 and routed around the driven element assemblies 32, 32', and the cable management apparatus 40 which is attached to the cables 36, 36'. The first driven element assembly 32 is attached to the first link arm 22; the second driven element assembly 32' is attached to the second link arm 22'. The driven element assemblies 32, 32' and cable management apparatus 40 provides the ability to actively control the articulation of the hinge 26, i.e. the relationship between the link arms 22, 22' and the spreader arm 30, in an antagonistic arrangement without springs in the load path. That is, there is a direct line of action from the driven element assemblies 32, 32' to the spreader arm 30. Further, by using these driven element assemblies 32, 32' and the cable management apparatus 40, a continuous cable network can be used that circulates cable from one side of the link arms 22, 22' to the other side of the link arms 22, 22' which reduces the amount of cable required to actuate the hinge 26.

Figure 3:
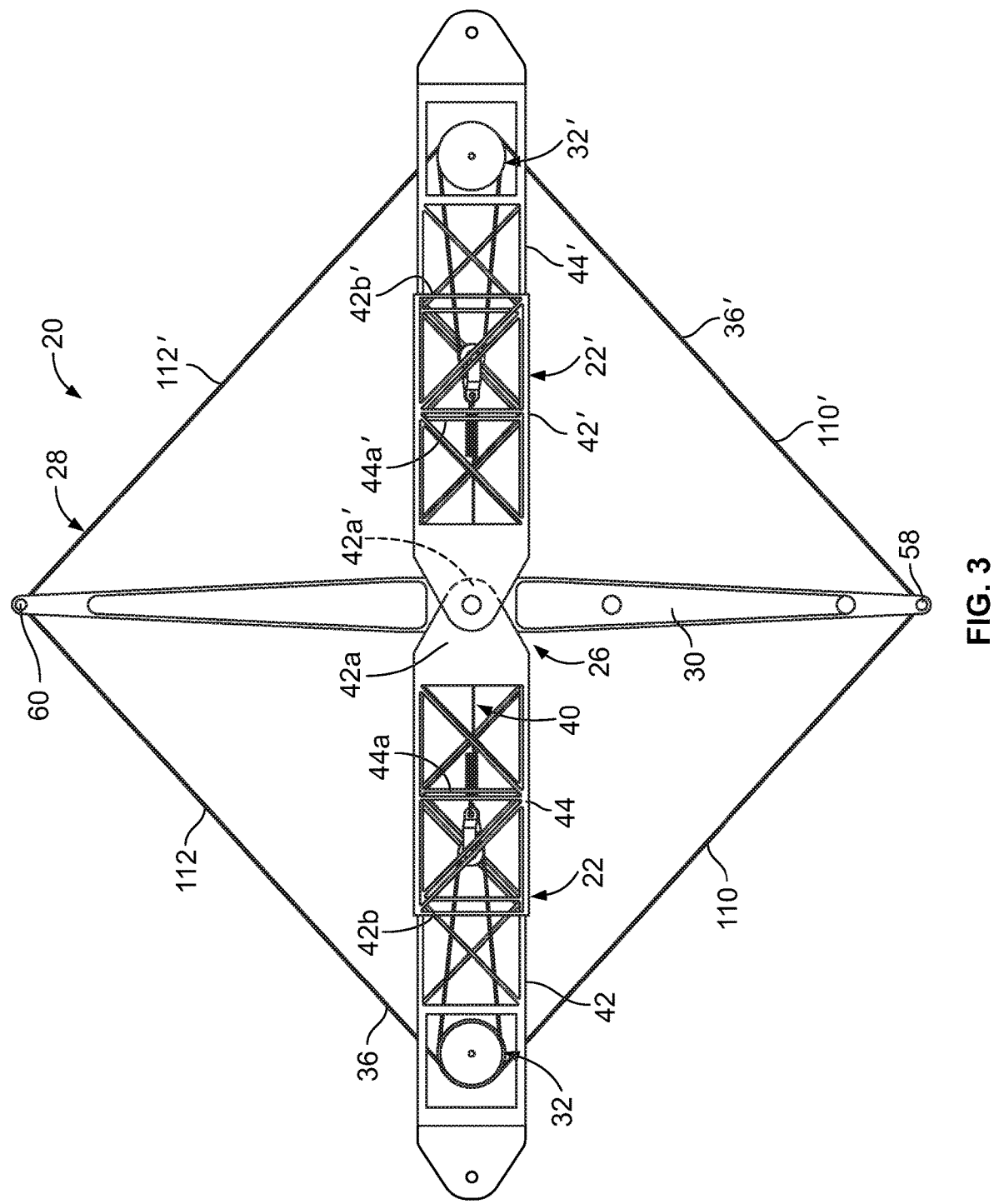
FIG. 3 is a side elevation view of the manipulator with the link arms in a retracted position.
Figure 4:
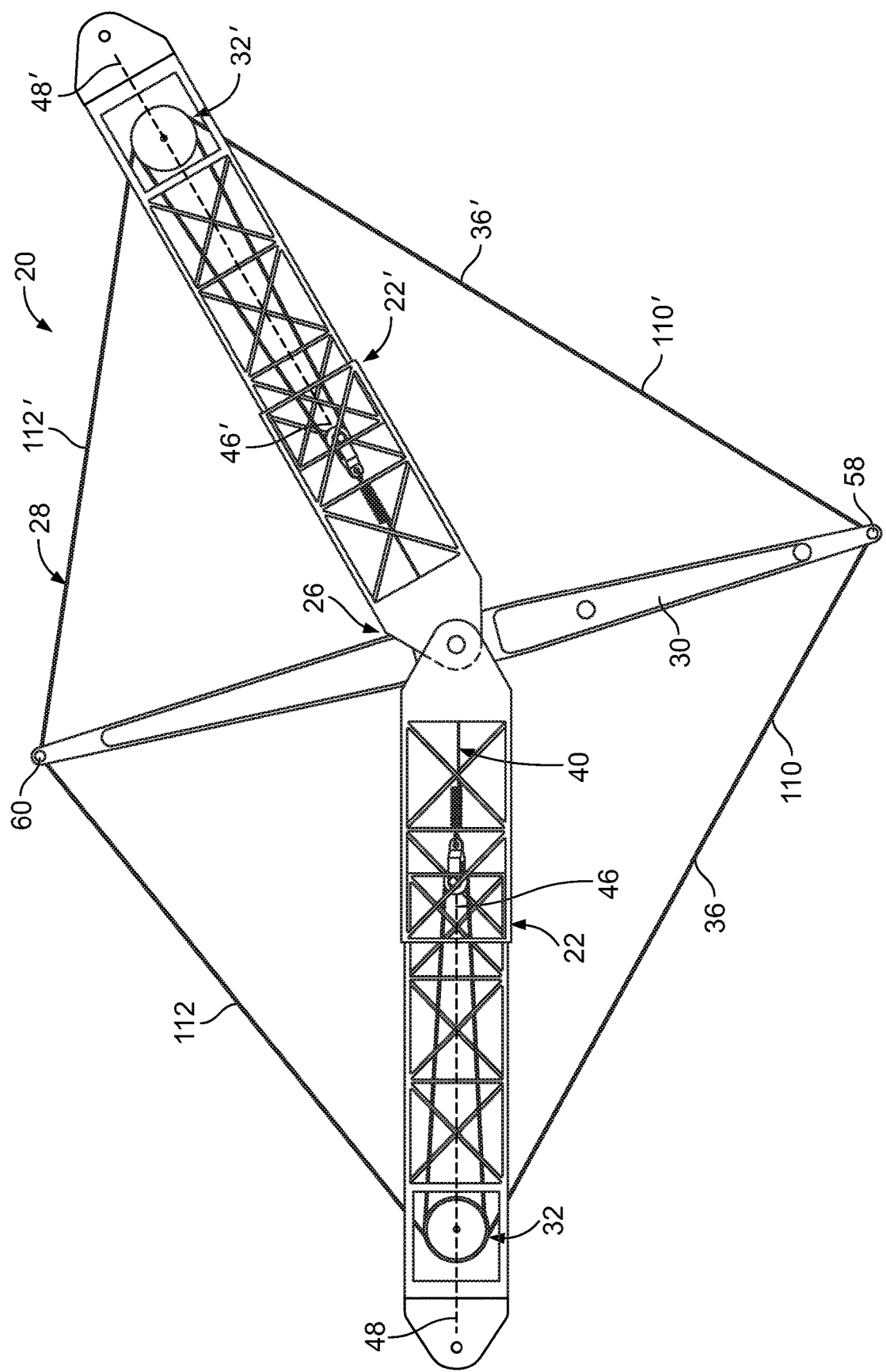
FIG. 4 is a side elevation view of the manipulator with the link arms in an articulated position.
Figure 5:
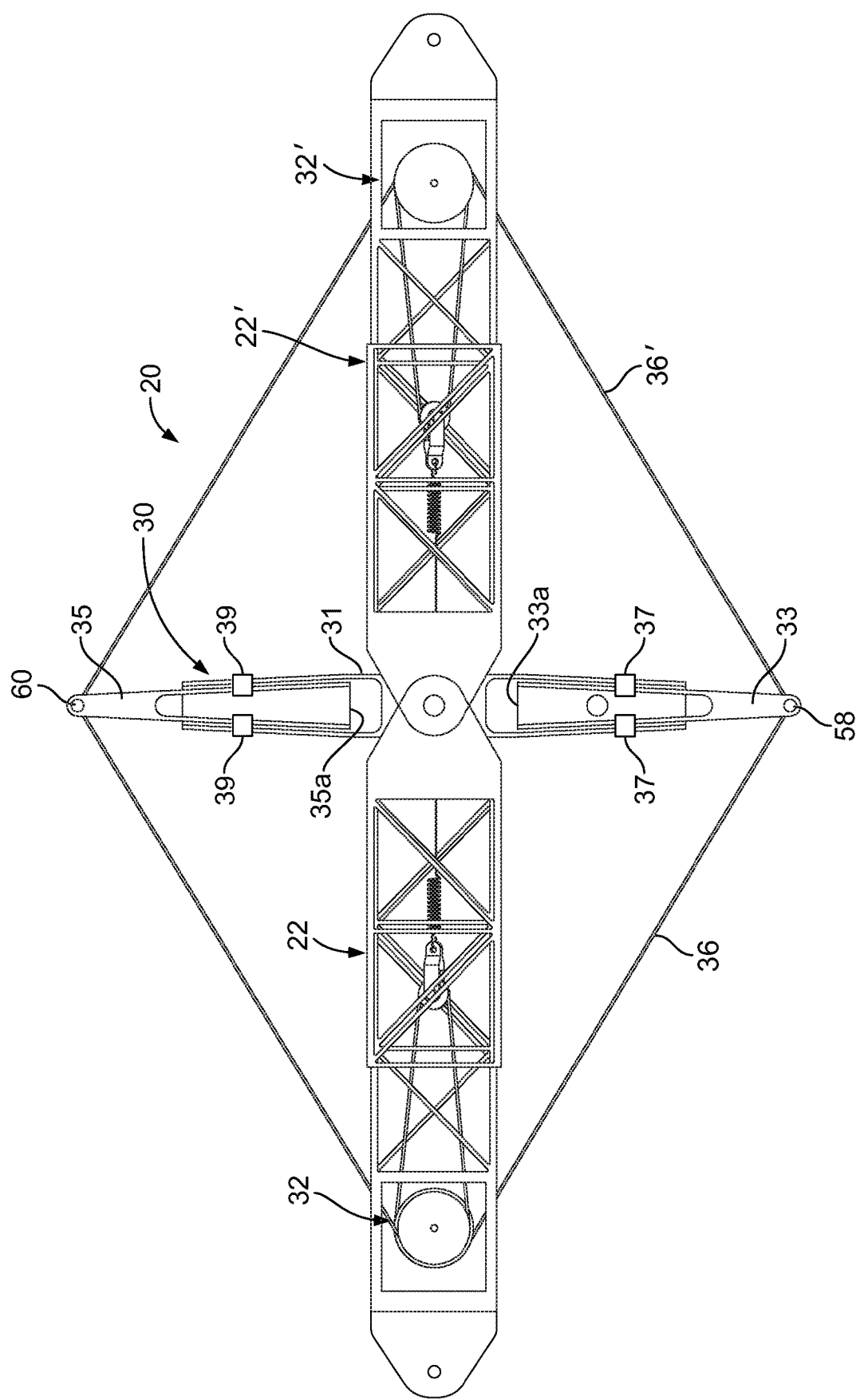
FIG. 5 is a side elevation view of the manipulator with an embodiment of a spreader arm.

The spreader arm 30 is a stiff member that passes through the spreader opening 54 and is coupled to the hinge 26 as described herein. In an embodiment, as shown in FIGS. 1-4, the spreader arm 30 is a continuous elongated, stiff member and may be formed as a truss. In an embodiment as shown in FIG. 5, the spreader arm 30 is formed of an inner section 31 and outer sections 33, 35 attached thereto and which are capable of telescoping relative to the inner section. Each section 31, 33, 35 is an elongated, stiff member and may be formed as a truss. For example, each section 31, 33, 35 may be formed of first and second walls which are connected together by side walls to form a box-like shape. The outer sections 33, 35 may be smaller than the inner section 31 so that the inner ends 33a, 35a of the outer sections 31, 35 seat within the inner section 31. Alternatively, the inner section 31 may be smaller than the outer sections 31, 35 so that the inner section 31 can seat within the outer sections 31, 35. Latches 37 are provided between the inner section 31 and the outer section 33. Latches 39 are provided between the inner section 31 and the outer section 35. When the latches 37 are engaged, the inner and outer sections 31, 33 cannot move relative to each other; when the latches 39 are engaged, the inner and outer sections 31, 35 cannot move relative to each other. When the latches 37 are disengaged, the outer section 33 can move relative to the inner section 31; when the latches 39 are disengaged, the outer section 35 can move relative to the inner section 31. The latches 37, 39 are driven by a motor to latch and unlatch. The spreader arm 30 has opposite ends 58, 60 which are attached to the cables 36, 36' as described herein. The spreader arm 30 can take a variety of shapes, e.g. elongated rectangular-shaped, a pair of triangles forming an elongated member. The spreader arm 30 may be solid.

Each cable 36, 36' is a fixed-length member which has its length fixed prior to operation of the manipulator 20. If desired, each cable 36, 36' can incorporate a length adjustment feature (e.g., removable section, turnbuckle, etc.) that allows the lengths to be adjusted after installation with the link arms 22, 22', the driven element assembly 32, 32' and the cable management apparatus 40.

Figure 6:
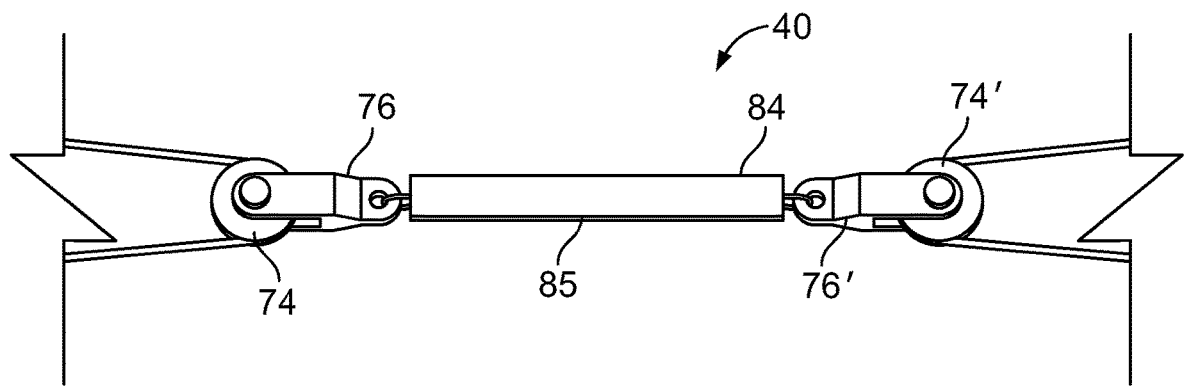
FIG. 6 is a first embodiment of a cable management apparatus used with the manipulator.
Figure 7:
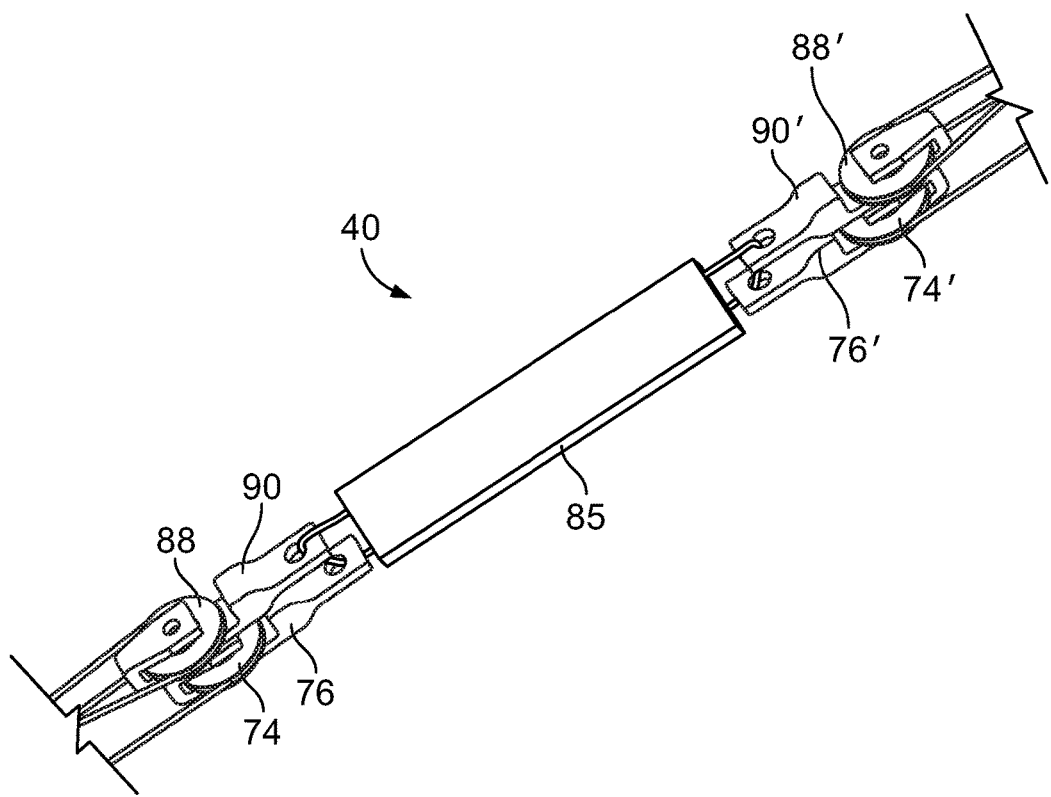
FIG. 7 is a second embodiment of a cable management apparatus used with the manipulator.

In a first embodiment as shown in FIG. 6, the cable management apparatus 40 includes a first pulley 74 rotatably mounted on a first bracket 76, a second pulley 74' rotatably mounted on a second bracket 76', and a tension spring apparatus 85 attached to the brackets 76, 82 for allowing the relative movement between the pulleys 74, 74' and the link arms 22, 22'. The tension spring apparatus 85 includes at least one tension spring and may include a tether(s). The tether(s), if provided, may be ropes, cables, tapes, etc. The pulley 74 and bracket 76 are positioned within the first link arm 22. The pulley 74' and bracket 76' are positioned within the second link arm 22'. In a second embodiment as shown in FIG. 7, the cable management apparatus 40 further includes an additional pulley 88 rotatably mounted on a bracket 90 which is attached to the tension spring apparatus 85, and an additional pulley 88' rotatably mounted on a bracket 90' which is attached to the tension spring apparatus 85. The first additional pulley 88 and its bracket 90 are positioned within the first link arm 22. The second additional pulley 88' and its bracket 90' are positioned within the second link arm 22'.

The tension spring apparatus 85 may take many forms. In an embodiment, the tension spring apparatus 85 is formed of a first tension spring 78 attached to the first bracket 76, and a second tension spring 84 attached to the second bracket 76', with a tether 86 attaching the tension springs 78, 84 and which extends through the hinge 26. In an embodiment, the tension spring apparatus 85 is formed of a first tension spring and a first tether attached together, with one end of the spring/tether combination attached to the first bracket 76 and the other end of the spring/tether combination attached to the inner section 42 of the link arm 22, a second tension spring and a second tether attached together, with one end of the second spring/tether combination attached to the second bracket 76' and the other end of the spring/tether combination attached to the inner section 42' of the link arm 22'. The attachment may be proximate to the hinge 26. In an embodiment, the tension spring apparatus 85 is formed of a first tension spring and a first tether attached together, with one end of the spring/tether combination attached to the first bracket 76 and the other end of the spring/tether combination attached to the pivot pin 56, a second tension spring and a second tether attached together, with one end of the second spring/tether combination attached to the second bracket 76' and the other end of the spring/tether combination attached to the pivot pin 56. In an embodiment, the tension spring apparatus 85 is formed of a continuous tension spring attached to the first and second brackets 76, 82, the spring extending through the hinge 26 (the tether(s) is(are) eliminated). In an embodiment, the tension spring apparatus 85 is formed of a first tension spring and a first tether attached together, with one end of the spring/tether combination attached to one of the brackets 76, 82 and a tether attaching the spring/tether combination to the other of the brackets 76, 82. If pulleys/brackets 88/90, 88'/90' are provided, the tension spring apparatus 85 is duplicated and attached to these brackets 90, 90' in the same manner as it is attached to the brackets 76, 82.

Figure 8:
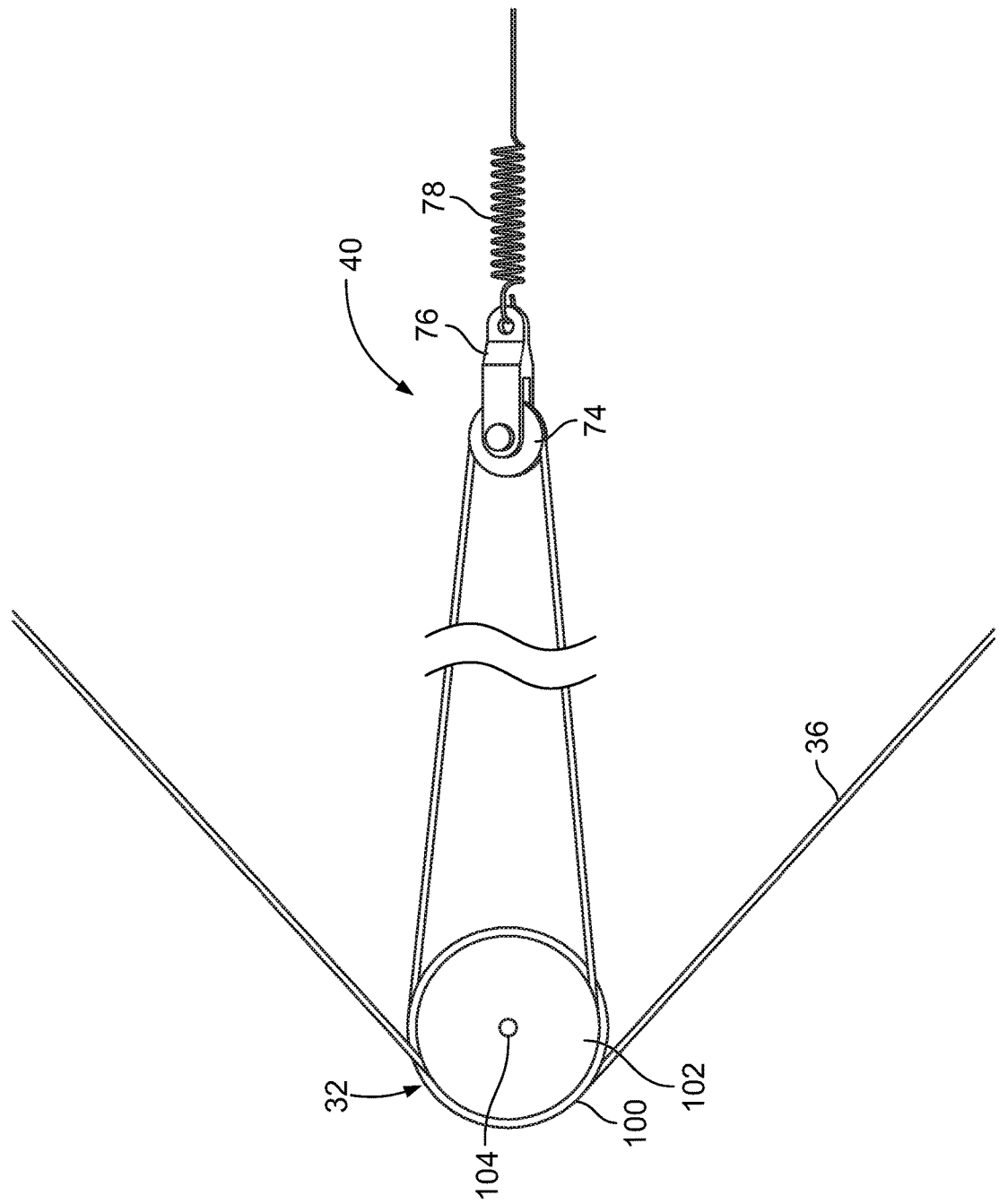
FIG. 8 is a side elevation view of a driven element assembly in accordance with a first embodiment and a portion of a cable management apparatus.
Figure 9:
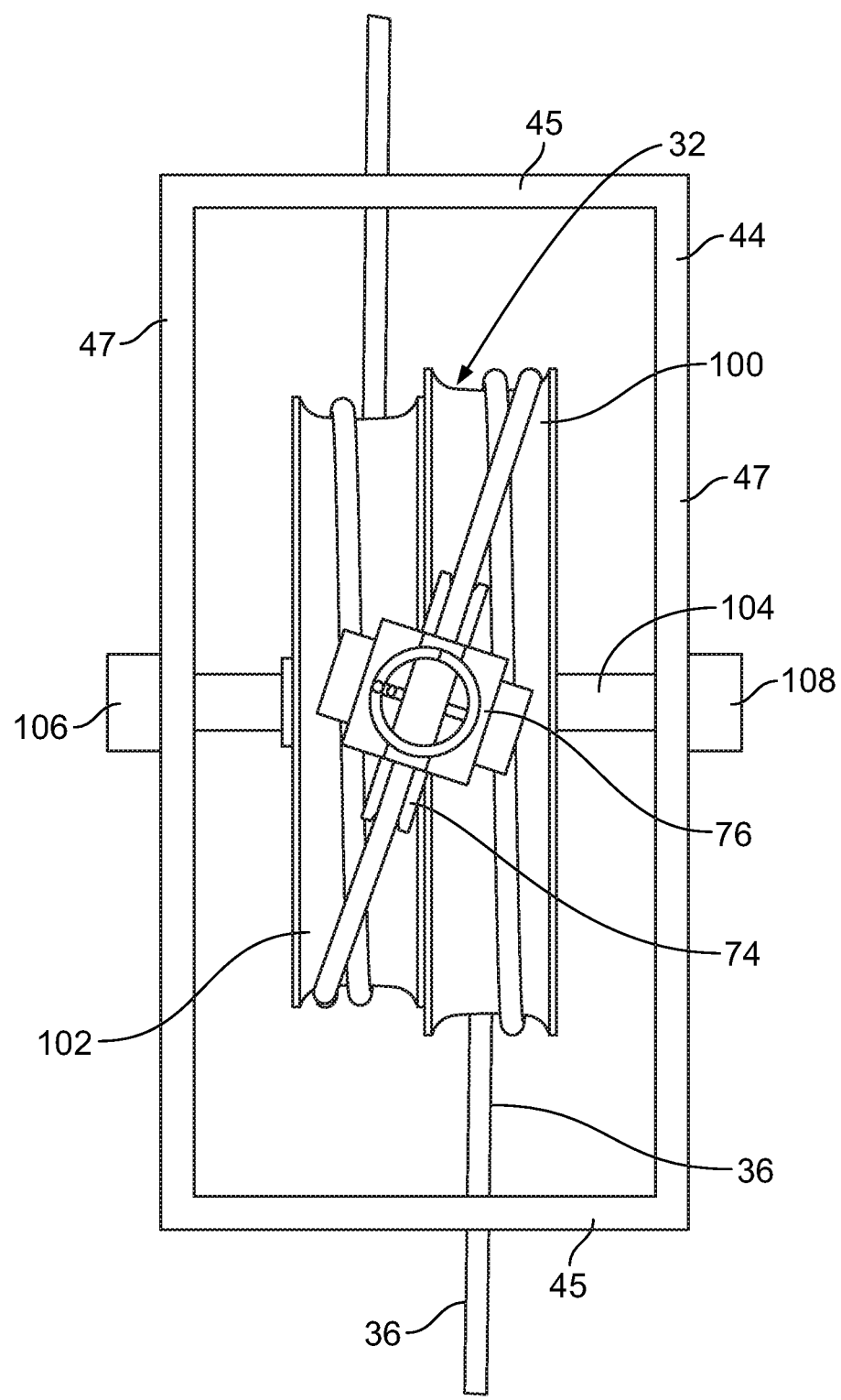
FIG. 9 is a cross-sectional view of the driven element assembly and a portion of a cable management apparatus of FIG. 8.

A first embodiment of the driven element assemblies 32, 32' is shown in FIGS. 8 and 9. The first embodiment of the driven element assemblies 32, 32' is used with the first embodiment of the cable management apparatus 40 (e.g., the cable management apparatus 40 that includes two pulleys 74, 74'). The first driven element assembly 32 is attached proximate to the outer end 44b of the outer section 44 of the first link arm 22; the second driven element assembly 32' is attached proximate to the outer end 44b' of the outer section 44' of the second link arm 22'. The structure of the first driven element assembly 32 is described with the understanding that the second driven element assembly 32' is identical, except that the second driven element assembly 32' is attached to the second link arm 22' and is in a mirrored orientation. Components of the second driven element assembly 32' which are identical to those of the first driven element assembly 32 are denoted with a prime. For ease in description, the attachment of the first driven element assembly 32 is described, with the understanding that the attachment of the second driven element assembly 32' is identical and in a mirrored orientation on the second link arm 22'.

The driven element assembly 32 includes first and second driven elements in the form of capstans 100, 102 which are rotationally mounted on a common shaft 104 such that the capstans 100, 102 are side-by-side. One capstan 102 may have a larger diameter than the diameter of the other capstan 100, or the diameters may be the same. The shaft 104 is rotationally attached to side walls 47 of the outer section 44 of the link arm 22. The first capstan 100 is driven by a first motor 106 mounted on the outer section 44 of the link arm 22. The second capstan 102 is driven by a second motor 108 mounted on the outer section 44 of the link arm 22.

The first cable 36 extends in the following route:
the cable 36 extends from its first end 36a which is affixed to the first end 58 of the spreader arm 30 to the first capstan 100,
the cable 36 extends one full revolution around the first capstan 100, and extends from the first capstan 100 to the pulley 74,
the cable 36 loops around the pulley 74, and extends from the pulley 74 to the second capstan 102,
the cable 36 extends one full revolution around the second capstan 102, and extends from the second capstan 102 to the second end 36b of the cable 36 which is affixed to the second end 60 of the spreader arm 30.

As a result, the cable 36 is shared above and below the link arm 22 and there are no springs in the load path of the cable 36. The pulley 74 may be at an angle relative to the axis of the rotation of the capstans 100, 102.

The second cable 36' extends in the same route except in a mirrored condition. As such, the specifics are not repeated herein.

When the motors are activated, the capstans 100, 102 are rotated to move cable 36 and/or cable 36' from between the link arm 22 and/or link arm 22' and the spreader arm 30 to between the driven element assembly 32 and/or driven element assembly 32' and the cable management apparatus 40.

When the link arms 22, 22' are fully extended, the tension spring(s) in the tension spring apparatus 85 is/are expanded.

The link arms 22, 22' can be telescoped individually or telescoped simultaneously. The telescoping of link arm 22 is described, with the understanding that the link arm 22' is telescoped in the same manner as the components are identical.

To telescope link arm 22 to shorten link arm 22, the latches 52 are unlatched to allow for the relative movement between the inner and outer sections 42, 44. The driven element assembly 32 is activated such that the portion 110 of the cable 36 between the driven element assembly 32 and the first end 58 of the spreader arm 30 is shortened and such that the portion 112 of the cable 36 between the driven element assembly 32 and the second end 60 of the spreader arm 30 is shortened. This passes additional cable length between the driven element assembly 32 and the tension spring apparatus 85. The tension spring(s) in the tension spring apparatus 85 compresses to take up this additional length of cable 36. Once the inner and outer sections 42, 44 are in the desired new position, the latches 52 are reengaged.

The spreader arm 30 can be telescoped to shorten the length of the spreader arm 30. To telescope the spreader arm 30, the latch 37, the latch 39 or both latches 37, 39 are unlatched to allow for the relative movement between the inner section 31 and the outer section or sections 33, 35 that are desired to be shortened. The driven element assemblies 32, 32' are activated such that the portions 110, 110' of the cables 36, 36' between the driven element assemblies 32, 32' and the first end 58 of the spreader arm 30 are shortened and/or such that the portions 112, 112' of the cables 36, 36' between the driven element assemblies 32, 32' and the second end 60 of the spreader arm 30 are shortened. This passes additional cable length between the driven element assemblies 32, 32' and the tension spring apparatus 85. The tension spring(s) in the tension spring apparatus 85 compress to take up this additional length of cable 36, 36'. Once the inner section 31 and the outer section or sections 33, 35 are in the desired new position, the latches 37, 39 are reengaged.

The link arms 22, 22' can be articulated individually relative to each other or articulated simultaneously relative to each other. The articulation of link arm 22 is described, with the understanding that the link arm 22' is articulated in the same manner as the components are identical.

To articulate the link arm 22, the latches 52 are latched to prevent relative movement between the inner and outer sections 42, 44. The driven element assembly 32 is activated such that the portion 110 of the cable 36 between the driven element assembly 32 and the first end 58 of the spreader arm 30 is shortened and the portion 112 of the cable 36 between the driven element assembly 32 and the second end 60 of the spreader arm 30 is lengthened, or such that the portion 110 of the cable 36 between the driven element assembly 32 and the first end 58 of the spreader arm 30 is lengthened and the portion 112 of the cable 36 between the driven element assembly 32 and the second end 60 of the spreader arm 30 is shortened. This causes the link arm 22 to rotate relative to link arm 22'.

To articulate both link arms 22, 22' at the same time, the latches 52, 52' are latched to prevent relative movement between the inner and outer sections 42, 44, 42', 44'. The driven element assemblies 32, 32' are activated such that the portions 110, 110' of the cable 36, 36' between the driven element assemblies 32, 32' and the first end 58 of the spreader arm 30 are shortened or lengthened, and the portions 112, 112' of the cables 36, 36' between the driven element assemblies 32, 32' and the second end 60 of the spreader arm 30 are oppositely affected (for example, if the first portions 110, 110' are shortened, then the second portions 112, 112' are lengthened). This causes the link arm 22 to rotate relative to link arm 22'.

In each of these motions, if the capstans 100, 102 of the driven element assemblies 32, 32' are different sizes, the capstans 100, 102 are rotated at different speeds so that tension on the cable(s) 36, 36' is maintained.

Figure 10:
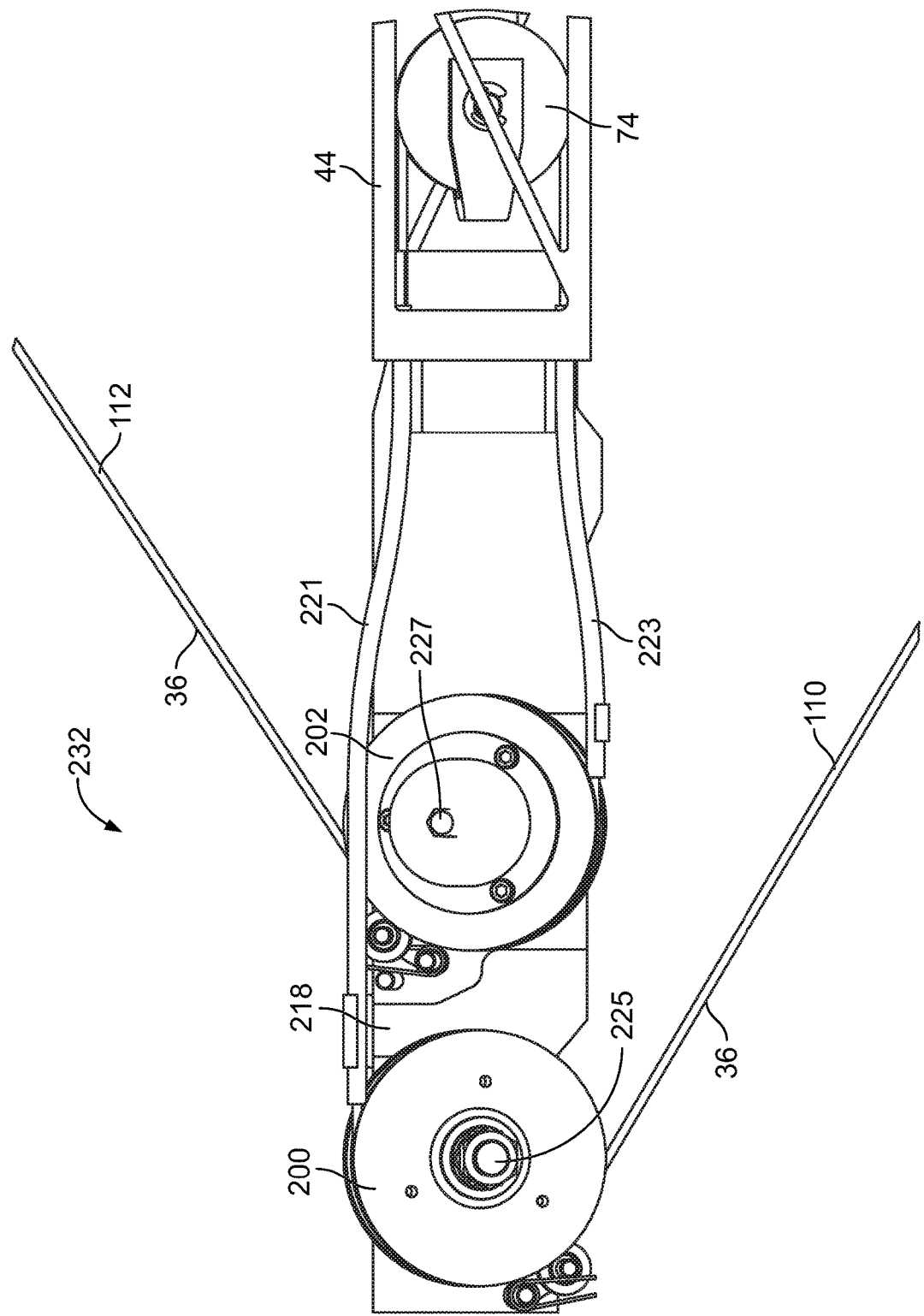
FIG. 10 is a side elevation view of a driven element assembly in accordance with a second embodiment and a portion of a cable management apparatus.
Figure 11:
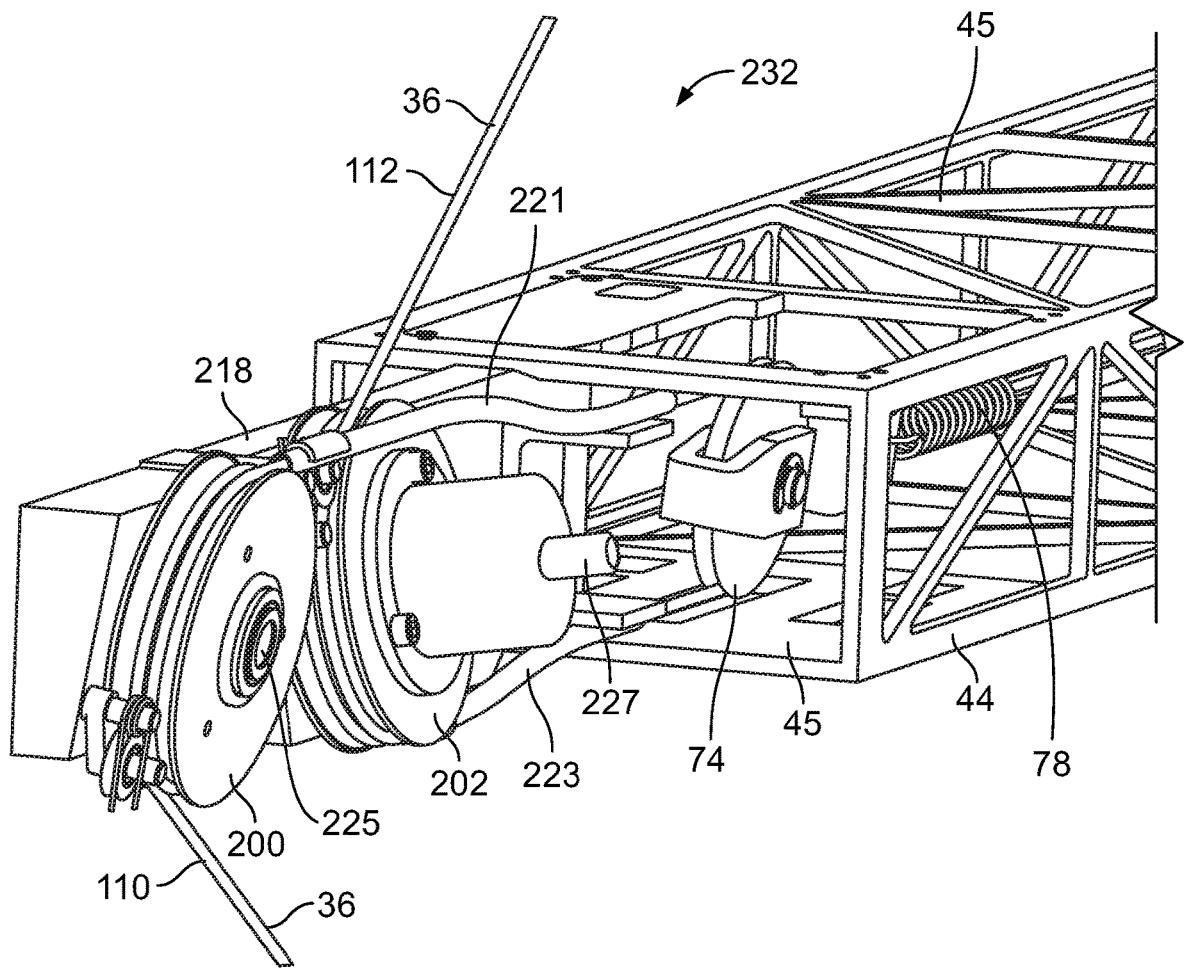
FIG. 11 is a perspective view of the driven element assembly and cable management apparatus of FIG. 10.

A second embodiment of the driven element assemblies 232, 232' is shown in FIGS. 10 and 11. A portion of the frame 44 is cut away for clarity. The second embodiment of the driven element assemblies 232, 232' is used with the first embodiment of the cable management apparatus 40 (e.g., the cable management apparatus 40 that includes two pulleys 74, 74'). The first driven element assembly 232 is attached proximate to the outer end 44b of the outer section 44 of the first link arm 22 (this replaces first driven element assembly 32); the second driven element assembly 232' is attached proximate to the outer end 44b' of the outer section 44' of the second link arm 22' (this replaces second driven element assembly 32'). The structure of the first driven element assembly 232 is described with the understanding that the second driven element assembly 232' is identical, except that the second driven element assembly 232' is attached to the second link arm 22' and is in a mirrored orientation. Components of the second driven element assembly 232' which are identical to those of the first driven element assembly 232 are denoted with a prime. For ease in description, the attachment of the first driven element assembly 232 is described, with the understanding that the attachment of the second driven element assembly 232' is identical and in a mirrored orientation on the second link arm 22'.

The driven element assembly 232 includes first and second driven elements in the form capstans 200, 202 mounted on a frame 218 fixedly attached within the outer section 44 and a plurality of tubes 221, 223 for routing the cable to the cable management apparatus 40. The first capstan 202 is mounted on a shaft 225 which is rotationally attached to the frame 218 and driven by a motor (not shown) mounted on the outer section 44 of the link arm 22. The first capstan 200 is at an angle relative to the centerline 48 of the outer section 44 of the link arm 22. The second capstan 202 is mounted on a shaft 227 which is rotationally attached to the same frame 218 and driven by a motor (not shown) mounted on the outer section 44 of the link arm 22. The second capstan 202 is at an angle relative to the centerline 48 of the outer section 44 of the link arm 22. The first and second capstans 200, 202 are angled at different angles relative to the centerline 48 of the link arm 22 and are canted in opposite directions. The first capstan 200 is spaced from the second capstan 202 along the length of the link arm 22. Each capstan 200, 202 has a predetermined diameter which may be the same or may be different. The tube 221 is mounted on the frame 218 between the first capstan 200 and the pulley 74. The tube 223 is mounted on the frame 218 between the second capstan 202 and the pulley 74.

The first cable 36 extends in the following route:
the cable 36 extends from its first end 36*a* which is affixed to the first end 58 of the spreader arm 30 to the first capstan 200,
the cable 36 extends at least one full revolution around the first capstan 200, and extends from the first capstan 200 to the pulley 74 through the first tube 221,
the cable 36 loops around the pulley 74, and extends from the pulley 74 to the second capstan 202 through the second tube 223,
the cable 36 extends at least one full revolution around the second capstan 202, and extends from the second capstan 202 to the second end 36*b* of the cable 36 which is affixed to the second end 60 of the spreader arm 30.

As a result, the cable 36 is shared above and below the link arm 22 and there are no springs in the load path of the cable 36. The pulley 74 may be at an angle relative to the axis of the rotation of the capstans 200, 202.

Since the first capstan 200 is at an angle relative to the centerline 48, this aligns the cable entry near the centerline 48 of the outer section 44, reducing undesirable torque on the driven element assembly 232. Since the second capstan 202 is at an angle relative to the centerline 48, this aligns the cable entry near the centerline 48 of the outer section 44, reducing undesirable torque on the driven element assembly 232.

The second cable 36' extends in the same route except in a mirrored condition. As such, the specifics are not repeated herein.

When the motors are activated, the capstans 200, 202 are rotated to move cable 36 and/or cable 36' from between the link arm 22 and/or link arm 22' and the spreader arm 30 to between the driven element assembly 232 and/or driven element assembly 232' and the cable management apparatus 40.

When the link arms 22, 22' are fully extended, the tension spring(s) in the tension spring apparatus 85 is/are expanded.

The link arms 22, 22' can be telescoped individually or telescoped simultaneously. The telescoping of link arm 22 is described, with the understanding that the link arm 22' is telescoped in the same manner as the components are identical.

To telescope link arm 22 to shorten link arm 22, the latches 52 are unlatched to allow for the relative movement between the inner and outer sections 42, 44. The driven element assembly 232 is activated such that the portion 110 of the cable 36 between the driven element assembly 232 and the first end 58 of the spreader arm 30 is shortened and such that the portion 112 of the cable 36 between the driven element assembly 232 and the second end 60 of the spreader arm 30 is shortened. This passes additional cable length between the driven element assembly 232 and the tension spring apparatus 85. The tension spring(s) in the tension spring apparatus 85 compress to take up this additional length of cable 36. Once the inner and outer sections 42, 44 are in the desired new position, the latches 52 are reengaged.

The spreader arm 30 can be telescoped to shorten the length of the spreader arm 30. To telescope the spreader arm 30, the latch 37, the latch 39 or both latches 37, 39 are unlatched to allow for the relative movement between the inner section 31 and the outer section or sections 33, 35 that are desired to be shortened. The driven element assemblies 232, 232' are activated such that the portions 110, 110' of the cables 36, 36' between the driven element assemblies 232, 232' and the first end 58 of the spreader arm 30 are shortened and/or such that the portions 112, 112' of the cables 36, 36' between the driven element assemblies 232, 232' and the second end 60 of the spreader arm 30 are shortened. This passes additional cable length between the driven element assemblies 232, 232' and the tension spring apparatus 85. The tension spring(s) in the tension spring apparatus 85 compress to take up this additional length of cable 36, 36'. Once the inner section 31 and the outer section or sections 33, 35 are in the desired new position, the latches 37, 39 are reengaged.

The link arms 22, 22' can be articulated individually relative to each other or articulated simultaneously relative to each other. The articulation of link arm 22 is described, with the understanding that the link arm 22' is articulated in the same manner as the components are identical.

To articulate the link arm 22, the latches 52 are latched to prevent relative movement between the inner and outer sections 42, 44. The driven element assembly 232 is activated such that the portion 110 of the cable 36 between the driven element assembly 232 and the first end 58 of the spreader arm 30 is shortened and the portion 112 of the cable 36 between the driven element assembly 232 and the second end 60 of the spreader arm 30 is lengthened, or such that the portion 110 of the cable 36 between the driven element assembly 232 and the first end 58 of the spreader arm 30 is lengthened and the portion 112 of the cable 36 between the driven element assembly 232 and the second end 60 of the spreader arm 30 is shortened. This causes the link arm 22 to rotate relative to the other link arm 22'.

To articulate both link arms 22, 22' at the same time, the latches 52, 52' are latched to prevent relative movement between the inner and outer sections 42, 44, 42', 44'. The driven element assemblies 232, 232' are activated such that one of the portions 110, 110' of the cable 36, 36' between the driven element assemblies 232, 232' and the first end 58 of the spreader arm 30 is shortened or lengthened, and the portions 112, 112' of the cables 36, 36' between the driven element assemblies 232, 232' and the second end 60 of the spreader arm 30 are oppositely affected (for example, if the first portions 110, 110' are shortened, then the second portions 112, 112' are lengthened). This causes the link arm 22' to rotate relative to the other link arm 22.

In each of these motions, if the capstans 200, 202 of the driven element assemblies 232, 232' are different sizes, the capstans 200, 202 are rotated at different speeds so that tension on the cable(s) 36, 36' is maintained.

While tubes are shown and described, routing the cable 36, 36' could instead be directed by idler rollers such as those shown in the third embodiment herein.

Figure 12:
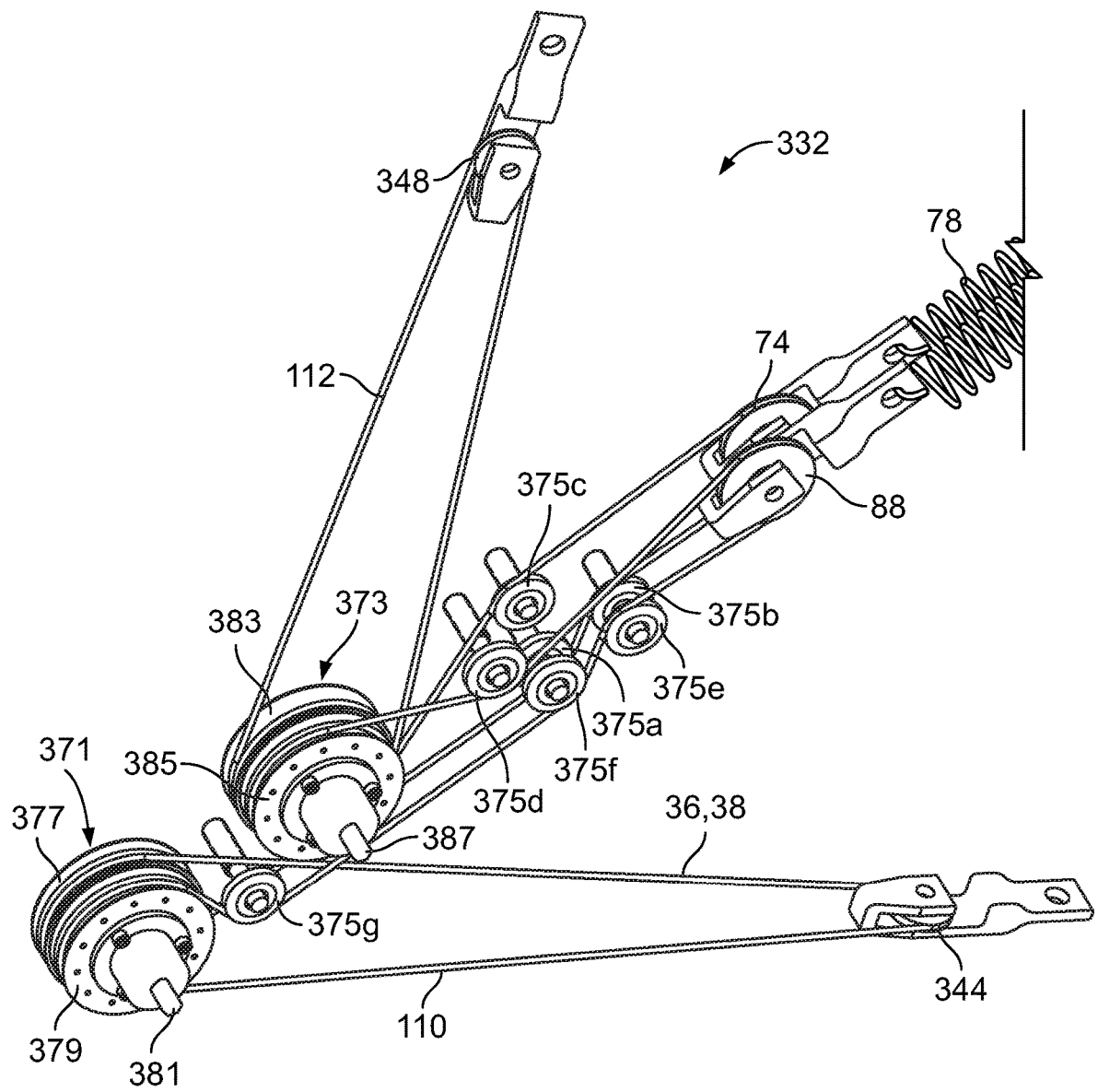
FIG. 12 is a perspective view of a driven element assembly in accordance with a third embodiment and cable management apparatus.

A third embodiment of the driven element assemblies 332, 332' is shown in FIG. 12. The third embodiment of the driven element assemblies 332, 332' is used with the second embodiment of the cable management apparatus 40 (e.g., the cable management apparatus 40 that includes four pulleys 74, 74', 88, 88'). The first driven element assembly 332 is attached proximate to the outer end 44b of the outer section 44 of the first link arm 22 (this replaces first driven element assembly 32); the second driven element assembly 332' is attached proximate to the outer end 44b' of the outer section 44' of the second link arm 22' (this replaces second driven element assembly 32'). The structure of the first driven element assembly 332 is described with the understanding that the second driven element assembly 332' is identical, except that the second driven element assembly 332' is attached to the second link arm 22' and is in a mirrored orientation. Components of the second driven element assembly 332' which are identical to those of the first driven element assembly 332 are denoted with a prime. For ease in description, the attachment of the first driven element assembly 332 is described, with the understanding that the attachment of the second driven element assembly 332' is identical and in a mirrored orientation on the second link arm 22'.

The driven element assembly 332 includes first and second driven elements in the form differential capstan pairs 371, 373 and non-driven elements in the form of a plurality of idler rollers 375a, 375b, 375c, 375d, 375e, 375f, 375g. The first differential capstan pair 371 is formed of a larger diameter capstan 377 and a smaller diameter capstan 379 mounted on a shaft 381. The capstans 377, 379 are side-by-side on the shaft 381. The shaft 381 is rotationally attached to the outer section 44 of the link arm 22 and driven by a motor (not shown) mounted on the outer section 44 of the link arm 22. The second differential capstan pair 373 is formed of a larger diameter capstan 383 and a smaller diameter capstan 385 mounted on a shaft 387. The capstans 383, 385 are side-by-side. The shaft 387 is rotationally attached to the outer section 44 of the link arm 22 and driven by a motor (not shown) mounted on the outer section 44 of the link arm 22. The first differential capstan pair 371 is spaced from the second differential capstan pair 373 along the length of the link arm 22. The first, second, third, fourth, fifth and sixth idler rollers 375a, 375b, 375c, 375d, 375e, 375f are rotationally mounted on shafts between the second differential capstan pair 373 and the pulleys 74, 80. The shafts of the idler rollers 375a, 375b, 375c, 375d, 375e, 375f are attached to the outer section 44 of the link arm 22. Some of the idler rollers may be mounted on common shafts. The seventh idler roller 375g is rotationally mounted on a shaft between the first and second differential capstan pairs 371, 373. The shaft of the idler roller 375g is rotationally attached to the outer section 44 of the link arm 22.

The first and second cables 36, 36' are continuous loops. In this third embodiment, the first end 58 of the spreader arm 30 has a non-driven element in the form of a first pulley 344 around which the first cable 36 loops; the first end 58 of the spreader arm 30 has a non-driven element in the form of a second pulley around which the second cable 36' loops, the second end 60 of the spreader arm 30 has a non-driven element in the form of a first pulley 348 around which the first cable 36 loops; the second end 60 of the spreader arm 30 has a non-driven element in the form of a second pulley around which the second cable 36' loops.

The first cable 36 extends in the following route:
the cable 36 loops around the first pulley 344 on the spreader arm 30, and extends from the first pulley 344 to the first differential capstan pair 371,
the cable 36 loops around the larger diameter capstan 377 of the first differential capstan pair 371, and extends from the larger diameter capstan 377 of the first differential capstan pair 371 to the first idler roller 375a,
the cable 36 loops partially around the first idler roller 375a, and extends from the first idler roller 375a to the second idler roller 375b,
the cable 36 loops partially around the second idler roller 375b, and extends from the second idler roller 375b to the first pulley 74 of the cable management apparatus 40,
the cable 36 loops partially around the first pulley 74 of the cable management apparatus 40, and extends from the first pulley 74 of the cable management apparatus 40 to the third idler roller 375c,
the cable 36 loops partially around the third idler roller 375c, and extends from the third idler roller 375c to the second differential capstan pair 373,
the cable 36 loops partially around the larger diameter capstan 383 of the second differential capstan pair 373 and extends from the larger diameter capstan 383 to the second pulley 348 on the spreader arm 30,
the cable 36 loops partially around the second pulley 348 on the spreader arm 30 and extends to the second differential capstan pair 373,
the cable 36 loops partially around the smaller diameter capstan 385 of the second differential capstan pair 373 and extends from the smaller diameter capstan 385 to the fourth idler roller 375d,
the cable 36 loops partially around the fourth idler roller 375d, and extends from the fourth idler roller 375d to the second pulley 88 of the cable management apparatus 40,
the cable 36 loops partially around the second pulley 88 of the cable management apparatus 40, and extends from the second pulley 88 of the cable management apparatus 40 to the fifth idler roller 375e,
the cable 36 loops partially around the fifth idler roller 375e, and extends from the fifth idler roller 375e to the sixth idler roller 375f,
the cable 36 loops partially around the sixth idler roller 375f, and extends from the sixth idler roller 375f to the seventh idler roller 375g,
the cable 36 loops partially around the seventh idler roller 375g, and extends from the seventh idler roller 375g to the first differential capstan pair 371,
the cable 36 loops partially around the smaller diameter capstan 379 of the first differential capstan pair 371 and extends from the smaller diameter capstan 379 to the first pulley 344 on the first end 58 of the spreader arm 30.

The pulleys 74, 88 may be at angles relative to the axis of the rotation of the differential capstan pairs 371, 373.

While idler rollers 375a, 375b, 375c, 375d, 375e, 375f are shown and described in a particular orientation and number of rollers, it is to be understood that other orientations/numbers of idler rollers can be provided. While idler rollers 375a, 375b, 375c, 375d, 375e, 375f are shown and described, the routing the cable 36 could instead be directed by tubes such as those shown in the second embodiment.

The second cable 36' extends in the same route except in a mirrored condition. As such, the specifics are not repeated herein.

When the motors are activated, the first and second differential capstan pairs 371, 373 are rotated to move cable 36 and/or cable 36' from between the link arm 22 and/or link arm 22' and the spreader arm 30 to between the driven element assembly 332 and/or driven element assembly 332' and the cable management apparatus 40.

When the link arms 22, 22' are fully extended, the tension spring(s) in the tension spring apparatus 85 is/are expanded.

The link arms 22, 22' can be telescoped individually or telescoped simultaneously. The telescoping of link arm 22 is described, with the understanding that the link arm 22' is telescoped in the same manner as the components are identical.

To telescope link arm 22 to shorten link arm 22, the latches 52 are unlatched to allow for the relative movement between the inner and outer sections 42, 44. The driven element assembly 332 is activated such that the portion 110 of the cable 36 between the driven element assembly 332 and the first end 58 of the spreader arm 30 is shortened and such that the portion 112 of the cable 36 between the driven element assembly 332 and the second end 60 of the spreader arm 30 is shortened. This passes additional cable length between the driven element assembly 332 and tension spring apparatus 85. The tension spring(s) in the tension spring apparatus 85 compress to take up this additional length of cable 36. Once the inner and outer sections 42, 44 are in the desired new position, the latches 52 are reengaged.

The spreader arm 30 can be telescoped to shorten the length of the spreader arm 30. To telescope the spreader arm 30, the latch 37, the latch 39 or both latches 37, 39 are unlatched to allow for the relative movement between the inner section 31 and the outer section or sections 33, 35 that are desired to be shortened. The driven element assemblies 332, 332' are activated such that the portions 110, 110' of the cables 36, 36' between the driven element assemblies 332, 332' and the first end 58 of the spreader arm 30 is shortened and/or such that the portions 112, 112' of the cables 36, 36' between the driven element assemblies 332, 332' and the second end 60 of the spreader arm 30 is shortened. This passes additional cable length between the driven element assemblies 332, 332' and the tension spring apparatus 85. The tension spring(s) in the tension spring apparatus 85 compress to take up this additional length of cable 36, 36'. Once the inner section 31 and the outer section or sections 33, 35 are in the desired new position, the latches 37, 39 are reengaged.

The link arms 22, 22' can be articulated individually relative to each other or articulated simultaneously relative to each other. The articulation of link arm 22 is described, with the understanding that the link arm 22' is articulated in the same manner as the components are identical.

To articulate the link arm 22, the latches 52 are latched to prevent relative movement between the inner and outer sections 42, 44. The driven element assembly 332 is activated such that the portion 110 of the cable 36 between the driven element assembly 332 and the first end 58 of the spreader arm 30 is shortened and the portion 112 of the cable 36 between the driven element assembly 332 and the second end 60 of the spreader arm 30 is lengthened, or such that the portion 110 of the cable 36 between the driven element assembly 332 and the first end 58 of the spreader arm 30 is lengthened and the portion 112 of the cable 36 between the driven element assembly 332 and the second end 60 of the spreader arm 30 is shortened. This causes the link arm 22 to rotate relative to the other link arm 22'.

To articulate both link arms 22, 22' at the same time, the latches 52, 52' are latched to prevent relative movement between the inner and outer sections 42, 44, 42', 44'. The driven element assemblies 332, 332' are activated such that one of the portions 110, 110' of the cable 36, 36' between the driven element assemblies 332, 332' and the first end 58 of the spreader arm 30 is shortened or lengthened, and the portions 112, 112' of the cables 36, 36' between the driven element assemblies 332, 332' and the second end 60 of the spreader arm 30 are oppositely affected (for example, if the first portions 110, 110' are shortened, then the second portions 112, 112' are lengthened). This causes the link arm 22' to rotate relative to the other link arm 22.

In each of these motions, if the differential capstan pairs 371, 373 are different sizes, the differential capstan pairs 371, 373 are rotated at different speeds so that tension on the cable(s) 36, 36' is maintained.

Figure 13:
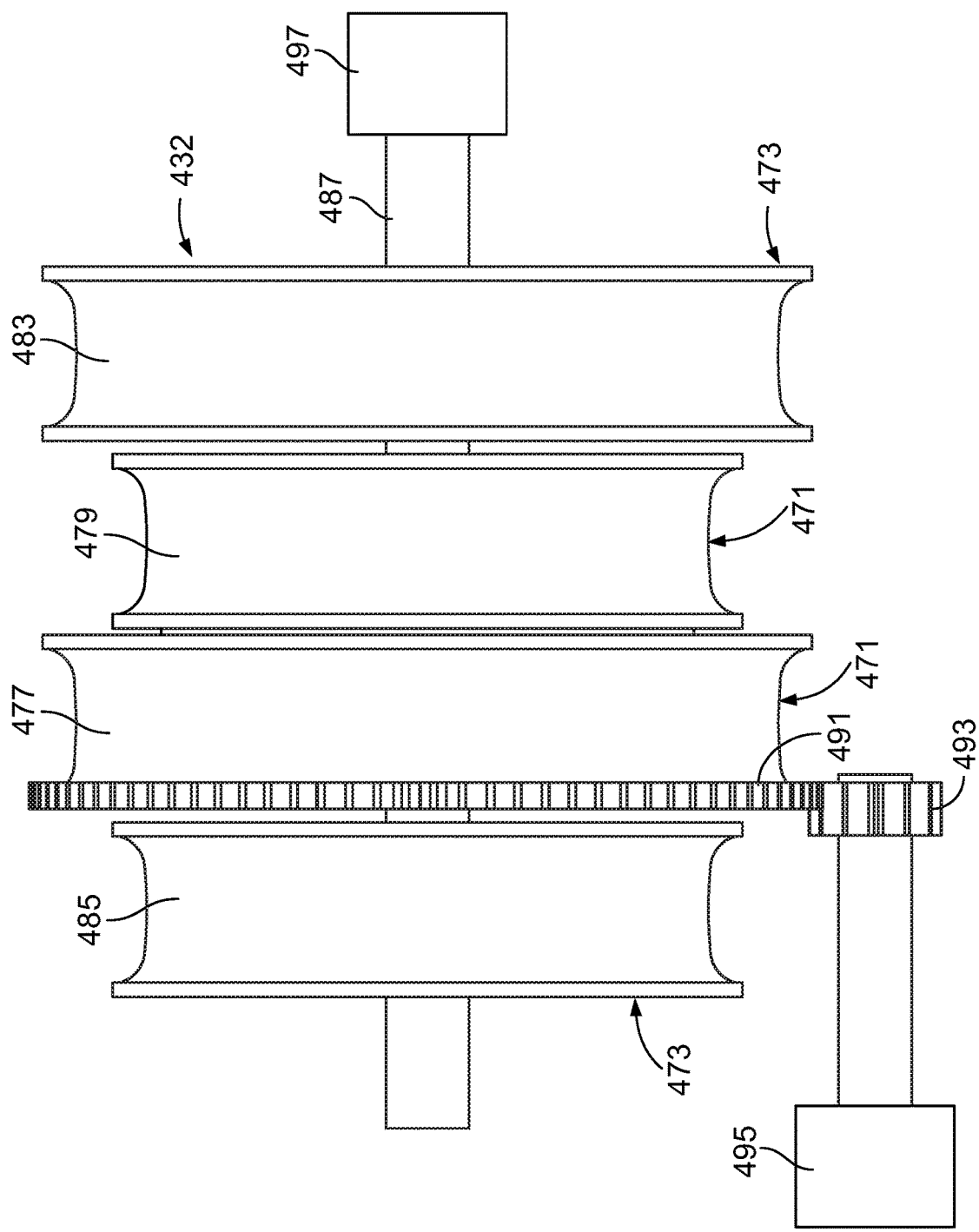
FIG. 13 is a front elevation view of a driven element assembly in accordance with a fourth embodiment.

A fourth embodiment of the driven element assemblies 432, 432' is shown in FIG. 13. The fourth embodiment of the driven element assemblies 432, 432' is used with the second embodiment of the cable management apparatus 40 (e.g., the cable management apparatus 40 that includes four pulleys 74, 74', 88, 88'). The first driven element assembly 432 is attached proximate to the outer end 44b of the outer section 44 of the first link arm 22 (this replaces first driven element assembly 32); the second driven element assembly 432' is attached proximate to the outer end 44b' of the outer section 44' of the second link arm 22' (this replaces second driven element assembly 32'). The structure of the first driven element assembly 432 is described with the understanding that the second driven element assembly 432' is identical, except that the second driven element assembly 432' is attached to the second link arm 22' and is in a mirrored orientation. Components of the first driven element assembly 432' which are identical to those of the second driven element assembly 332 are denoted with a prime. For ease in description, the attachment of the first driven element assembly 432 is described, with the understanding that the attachment of the second driven element assembly 432' is identical and in a mirrored orientation on the second link arm 22'.

The driven element assembly 432 includes first and second driven elements in the form differential capstan pairs 471, 473 mounted on a common shaft 487. The shaft 487 is rotatably attached to the outer end 44b of the outer section 44.

The first differential capstan pair 471 is formed of a larger diameter capstan 477 and a smaller diameter capstan 479 which are affixed together so that they rotate together around the shaft 487. The first differential capstan pair 471 is rotatable on the shaft 487. The larger diameter capstan 477 has teeth 491 on its exterior surface which mate with a toothed end of a shaft 493 of a motor 495. The motor 495 is mounted on the outer end 44b of the outer section 44.

The second differential capstan pair 473 is formed of a larger diameter capstan 483 and a smaller diameter capstan 485. The larger diameter capstan 483 of the second differential capstan pair 473 is proximate to the smaller diameter capstan 479 of the first differential capstan pair 471, and the smaller diameter capstan 485 of the second differential capstan pair 473 is proximate to the larger diameter capstan 477 of the first differential capstan pair 471. The first and second capstans 483, 485 of the second differential capstan pair 473 are affixed to the shaft 487 such that the first and second capstans 483, 485 rotate with the shaft 487. The first and second capstans 483, 485 may be keyed to the shaft 487 to ensure this rotation. The shaft 487 is driven by a motor 497 to rotate the first and second capstans 483, 485. The motor 497 is mounted on the outer end 44b of the outer section 44.

Like that of the third embodiment, the first and second cables 36, 36' are continuous loops which loop around pulleys on the ends 58, 60 of the spreader arm 30.

The first cable 36 extends in the following route:

the cable 36 loops around the first pulley on the end 58 of the spreader arm 30, and extends from the first pulley to the first differential capstan pair 471, the cable 36 loops around the larger diameter capstan 477 of the first differential capstan pair 471, and extends from the larger diameter capstan 477 to the pulley 74 of the cable management apparatus 40, the cable 36 loops partially around the pulley 74 of the cable management apparatus 40, and extends from the pulley 74 of the cable management apparatus 40 to the second differential capstan pair 473, the cable 36 loops partially around the larger diameter capstan 483 of the second differential capstan pair 473 and extends from the larger diameter capstan 483 to the pulley on the second end 60 of the spreader arm 30, the cable 36 loops partially around the pulley on the second end 60 of the spreader arm 30 and extends to the second differential capstan pair 473, the cable 36 loops partially around the smaller diameter capstan 485 of the second differential capstan pair 473 and extends from the smaller diameter capstan 485 to the pulley 88 of the cable management apparatus 40, the cable 36 loops partially around the pulley 88 of the cable management apparatus 40, and extends from the pulley 88 of the cable management apparatus 40 to the first differential capstan pair 471, the cable 36 loops partially around the smaller diameter capstan 479 of the first differential capstan pair 471 and extends from the smaller diameter capstan 479 to the pulley on the first end 58 of the spreader arm 30.

The pulleys 74, 80, may be at angles relative to the axis of the rotation of the differential capstan pairs 471, 473.

The second cable 36' extends in the same route except in a mirrored condition. As such, the specifics are not repeated herein.

When the motors are activated, the first and second differential capstan pairs 471, 473 are rotated to move cable 36 and/or cable 36' from between the link arm 22 and/or link arm 22' and the spreader arm 30 to between the driven element assembly 332 and/or driven element assembly 332' and the cable management apparatus 40.

When the link arms 22, 22' are fully extended, the tension spring(s) in the tension spring apparatus 85 is/are expanded.

While not shown, idler rollers or tubes may be provided in this embodiment to assist in routing the cables 36, 36'.

The link arms 22, 22' can be telescoped individually or telescoped simultaneously. The telescoping of link arm 22 is described, with the understanding that the link arm 22' is telescoped in the same manner as the components are identical.

To telescope link arm 22 to shorten link arm 22, the latches 52 are unlatched to allow for the relative movement between the inner and outer sections 42, 44. The driven element assembly 432 is activated such that the portion 110 of the cable 36 between the driven element assembly 432 and the first end 58 of the spreader arm 30 is shortened and such that the portion 112 of the cable 36 between the driven element assembly 432 and the second end 60 of the spreader arm 30 is shortened. This passes additional cable length between the driven element assembly 432 and the tension spring apparatus 85. The tension spring(s) in the tension spring apparatus 85 compress to take up this additional length of cable 36. Once the inner and outer sections 42, 44 are in the desired new position, the latches 52 are reengaged.

The spreader arm 30 can be telescoped to shorten the length of the spreader arm 30. To telescope the spreader arm 30, the latch 37, the latch 39 or both latches 37, 39 are unlatched to allow for the relative movement between the inner section 31 and the outer section or sections 33, 35 that are desired to be shortened. The driven element assemblies 432, 432' are activated such that the portions 110, 110' of the cables 36, 36' between the driven element assemblies 432, 432' and the first end 58 of the spreader arm 30 is shortened and/or such that the portions 112, 112' of the cables 36, 36' between the driven element assemblies 432, 432' and the second end 60 of the spreader arm 30 is shortened. This passes additional cable length between the driven element assemblies 432, 432' and the pulleys 74, 80. The tension spring(s) in the tension spring apparatus 85 compress to take up this additional length of cable 36, 36'. Once the inner section 31 and the outer section or sections 33, 35 are in the desired new position, the latches 37, 39 are reengaged.

The link arms 22, 22' can be articulated individually relative to each other or articulated simultaneously relative to each other. The articulation of link arm 22 is described, with the understanding that the link arm 22' is articulated in the same manner as the components are identical.

To articulate the link arm 22, the latches 52 are latched to prevent relative movement between the inner and outer sections 42, 44. The driven element assembly 432 is activated such that the portion 110 of the cable 36 between the driven element assembly 432 and the first end 58 of the spreader arm 30 is shortened and the portion 112 of the cable 36 between the driven element assembly 432 and the second end 60 of the spreader arm 30 is lengthened, or such that the portion 110 of the cable 36 between the driven element assembly 432 and the first end 58 of the spreader arm 30 is lengthened and the portion 112 of the cable 36 between the driven element assembly 432 and the second end 60 of the spreader arm 30 is shortened. This causes the link arm 22 to rotate relative to the other link arm 22'.

To articulate both link arms 22, 22' at the same time, the latches 52, 52' are latched to prevent relative movement between the inner and outer sections 42, 44, 42', 44'. The driven element assembly 432 is activated to such that one of the portions 110, 110' of the cable 36, 36' between the driven element assemblies 432, 432' and the first end 58 of the spreader arm 30 is shortened or lengthened, and the portions 112, 112' of the cables 36, 36' between the driven element assemblies 432, 432' and the second end 60 of the spreader arm 30 are oppositely affected (for example, if the first portions 110, 110' are shortened, then the second portions 112, 112' are lengthened). This causes the link arm 22' to rotate relative to the other link arm 22.

In each of these motions, if the differential capstan pairs 471, 473 are different sizes, the differential capstan pairs 471, 473 are rotated at different speeds so that tension on the cable(s) 36, 36' is maintained.

The use of differential capstan pairs 371, 373, 471, 473 reduces motor torque by order of magnitude over two times versus a simple hoist. In a simple hoist, wherein a weight is carried by a roller off of a single side of the roller, the torque is calculated by the following equation:

$$T_H = WR,$$

where T equals the torque of the hoist, W is the weight of the load being carried, and R is the radius of the roller.

In a differential capstan which where weight is carried off of one side of the first capstan and the other side of the second capstan, the torque is calculated by the following equation:

$$T_H = \frac{W}{2}(R_L - R_S),$$

where T equals the torque of the differential capstan, W is the weight of the load being carried $R_L$ is the radius of the larger diameter capstan, and $R_S$ is the radius of the smaller diameter capstan.

In the present disclosure, since the tension spring(s) in the tension spring apparatus 85 is/are provided, the above equation changes to:

$$T_H = \frac{(W - F_{MS})}{2}(R_L - R_S),$$

where T equals the torque of the differential capstan, W is the weight of the load being carried, $F_{us}$ is the force of the tension spring $R_L$ is the radius of the larger diameter capstan, and $R_S$ is the radius of the smaller diameter capstan.

The tension spring(s) in the tension spring apparatus 85 are used to maintain contact of the cable with the driven element assemblies, allowing the tension spring(s) in the tension spring apparatus 85 to have a much smaller stiffness than when included in the tension load path of the cable 36, 36'. In addition, the tension spring(s) in the tension spring apparatus 85 are used to prevent cable slack from occurring. Further, because the tension spring(s) in the tension spring apparatus 85 is/are not in the tension load path of the cable 36, 36', the tension spring(s) in the tension spring apparatus 85 does not affect the stiffness and the frequencies of the manipulator 20. Also, because there is not a tension spring in the cable load path, the fundamental (and higher) frequency of the manipulator 20 can be adjusted by varying the preload in the cables 36, 36', with the tension spring apparatus 85 managing the excess cable.

Figure 14:
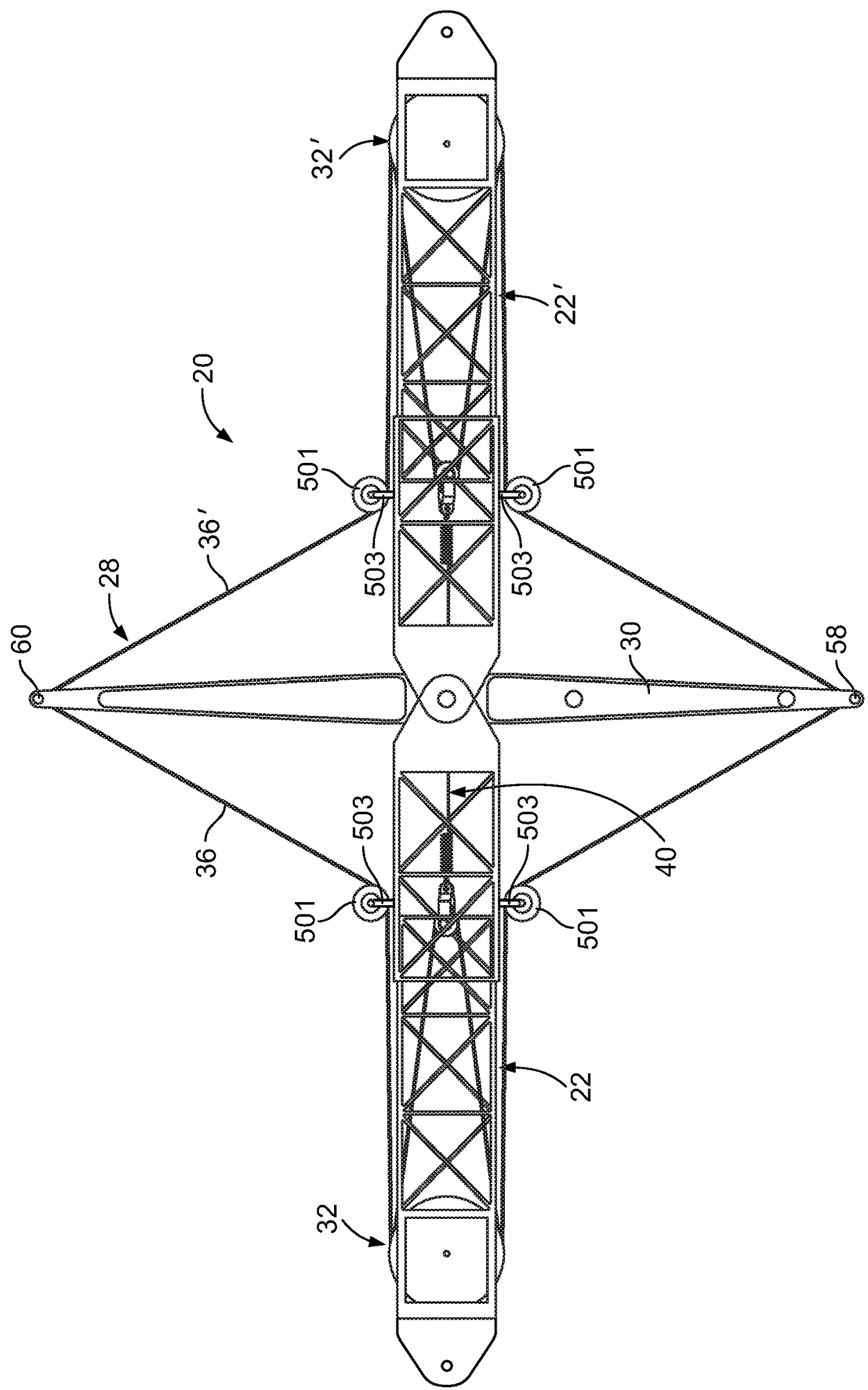
FIG. 14 is a side elevation view of the manipulator with cable management pulleys in accordance with a first embodiment.
Figure 15:
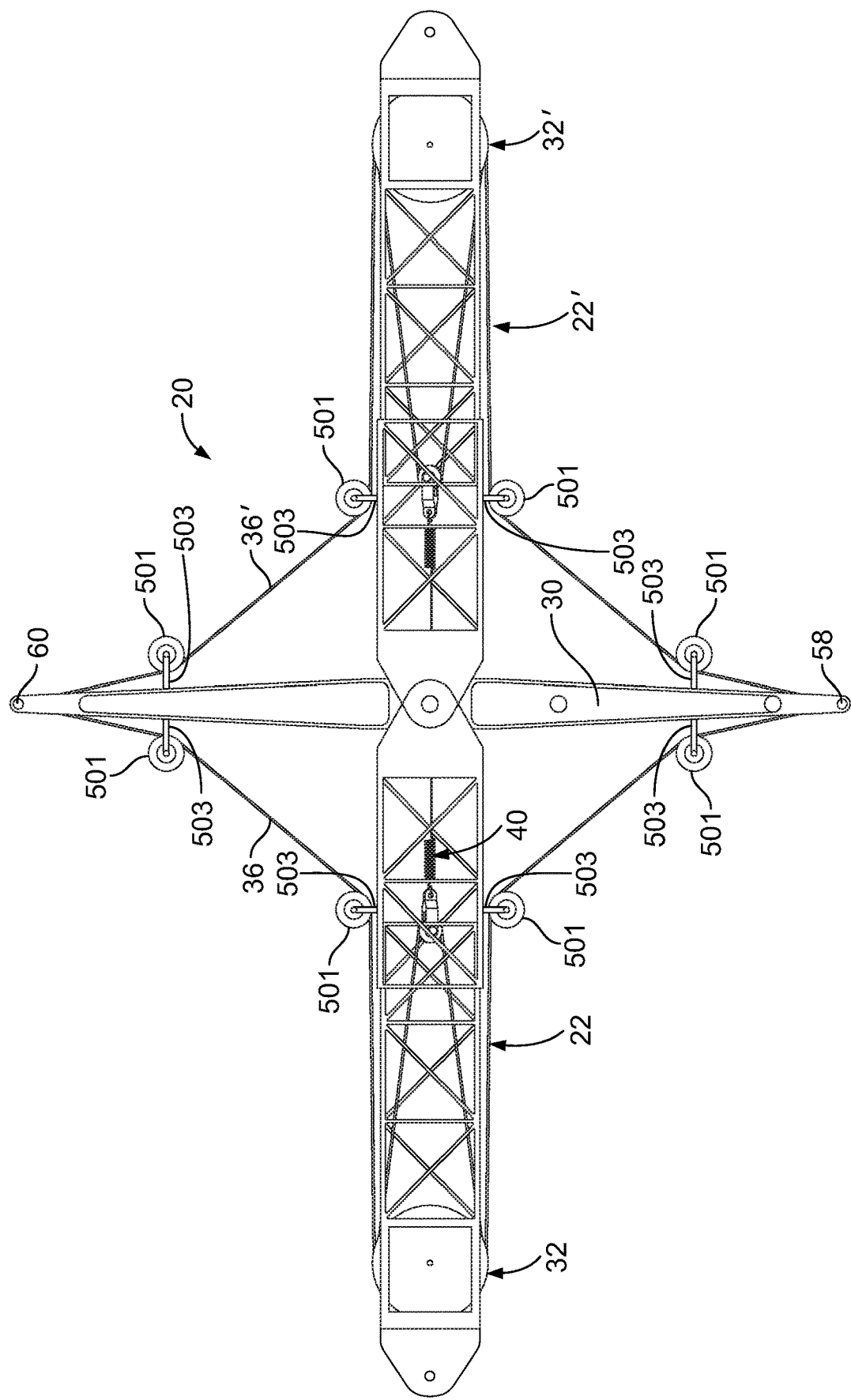
FIG. 15 is a side elevation view of the manipulator with cable management pulleys in accordance with a second embodiment.
Figure 16:
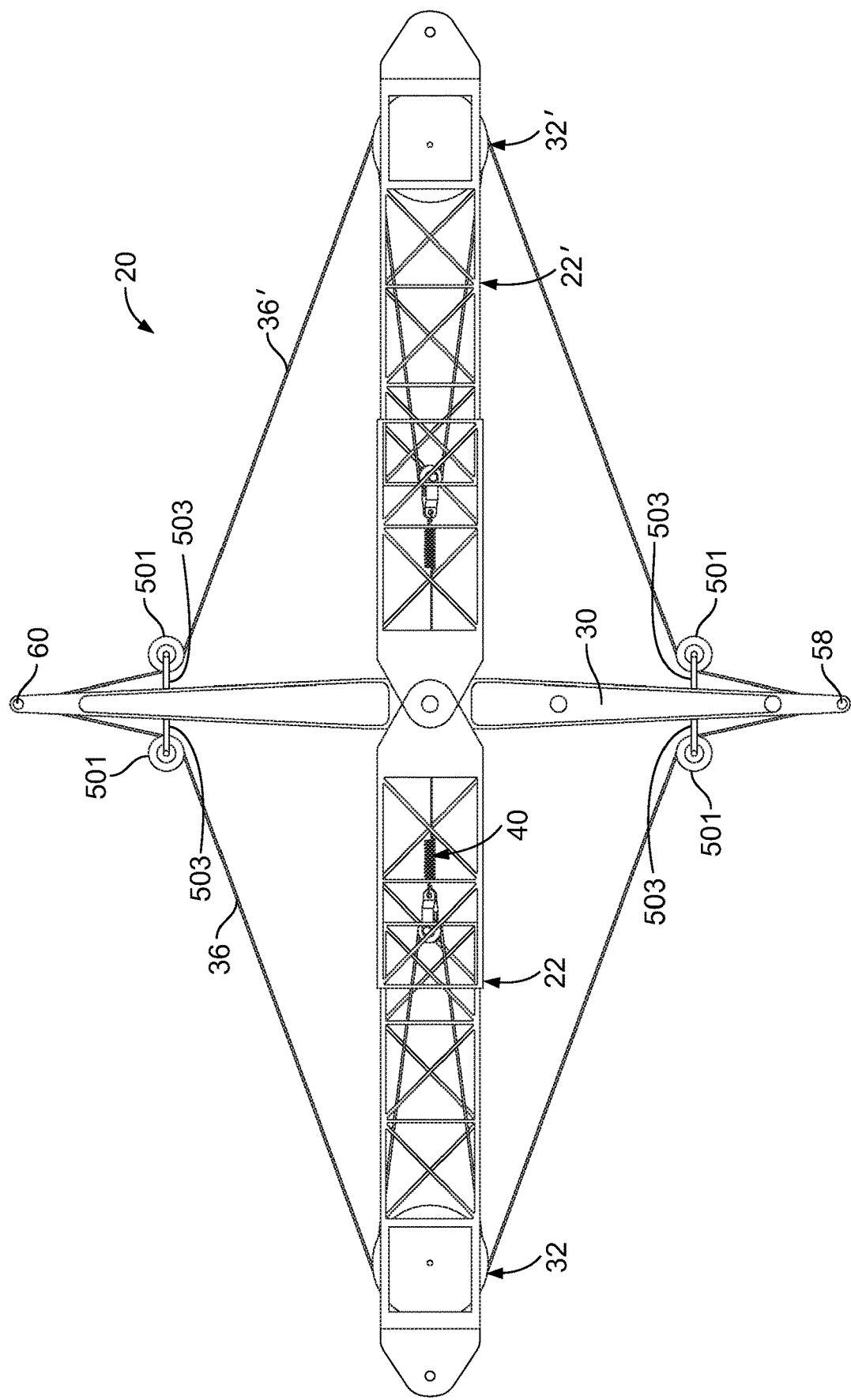
FIG. 16 is a side elevation view of the manipulator with cable management pulleys in accordance with a third embodiment.

In order to better manage the cables 36, 36' during articulation of the link arms 22, 22', moveable pulleys 501, see FIGS. 14-16, may be mounted to the link arms 22, 22' and/or on the spreader arm 30 to change the geometry of the cables 36, 36' relative to the link arms 22, 22' and the spreader arm 30.

In the embodiments shown in FIGS. 14-16, each pulley 501 is mounted on a motorized trolley 503 which allows the pulley 501 to move relative to the respective arm 22, 22', 30 to a plurality of positions and can be locked to the arm 22, 22', 30 in these positions by a lock. As shown in FIG. 14, the pulleys 501 are mounted on the link arms 22, 22'. As shown in FIG. 15, the pulleys 501 are mounted on the link arms 22, 22' and on the spreader arm 30. As shown in FIG. 16, the pulleys 501 are mounted on the spreader arm 30. The cable 36 is routed from the end 58 of the spreader arm 30, between the pulley 501 and a first side of the spreader arm 30 or a first side of the link arm 22 to the driven element assembly 32, 232, 332, 432, through the driven element assembly 32, 232, 332, 432 and cable management apparatus 40 as described herein, between the pulley 501 and a second side of the link arm 22 or the first side of the spreader arm 30, to the end 60 of the spreader arm 30. The cable 36' is routed from the end 58 of the spreader arm 30, between the pulley 501 and a second side of the spreader arm 30 or a first side of the link arm 22' to the driven element assembly 32', 232', 332', 432', through the driven element assembly 32', 232', 332', 432' and cable management apparatus 40 as described herein, between the pulley 501 and a second side of the link arm 22' or the second side of the spreader arm 30, to the end 60 of the spreader arm 30.

Figure 17:
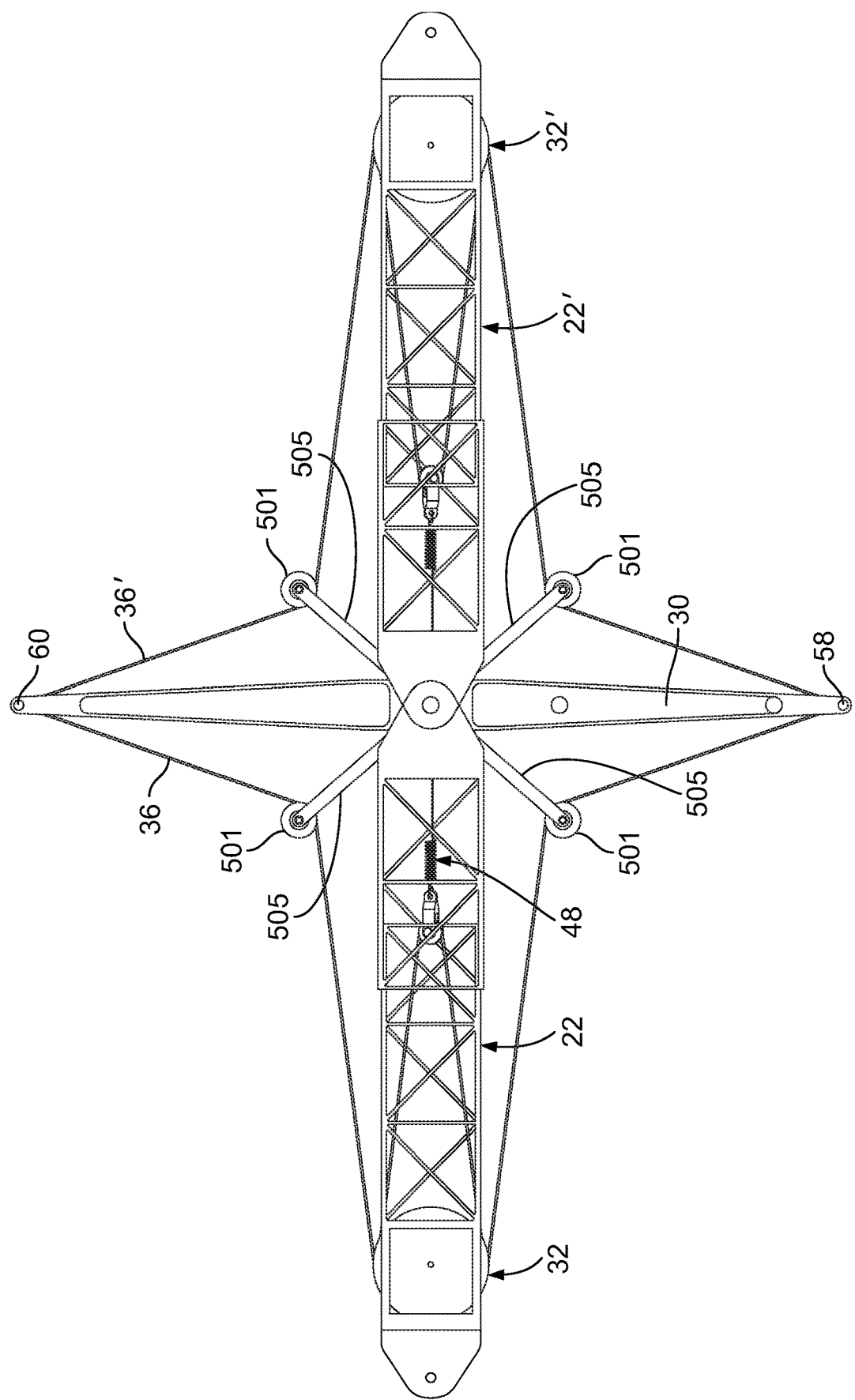
FIG. 17 is a side elevation view of the manipulator with cable management pulleys in accordance with a fourth embodiment.

In the embodiment shown in FIG. 17, each pulley 501 is mounted on a motorized pivotable or extendable arm 505 which allows the pulley 501 to move relative to the respective arm 22, 22', 30 to a plurality of positions and can be locked to the arm 22, 22', 30 in these positions by a lock. The pivotable or extendable arm 505 can be attached to the link arms 22, 22' or to the spreader arm 30. The arm 505 is driven by a motor (not shown). The cable 36 is routed from the end 58 of the spreader arm 30, between the pulley 501 and/or a first side of the spreader arm 30 and a first side of the link arm 22 to the driven element assembly 32, 232, 332, 432, through the driven element assembly 32, 232, 332, 432 and cable management apparatus 40 as described herein, between the pulley 501 and a second side of the link arm 22 and/or the first side of the spreader arm 30, to the end 60 of the spreader arm 30. The cable 36' is routed from the end 58 of the spreader arm 30, between the pulley 501 and a second side of the spreader arm 30 and a first side of the link arm 22' to the driven element assembly 32', 232', 332', 432', through the driven element assembly 32', 232', 332', 432' and cable management apparatus 40 as described herein, between the pulley 501 and a second side of the link arm 22' and the second side of the spreader arm 30, to the end 60 of the spreader arm 30.

In addition, while the driven element assemblies 32, 32'/232, 232'/332, 332'/432, 432' are shown on the link arms 22, 22' and the cables 36, 36' are shown as attached to the spreader arm 30, the driven element assemblies 32, 32'/232, 232'/332, 332'/432, 432' can be provided on the spreader arm 30, and the cables 36, 36' attached to the link arms 22, 22'.

Figure 19:
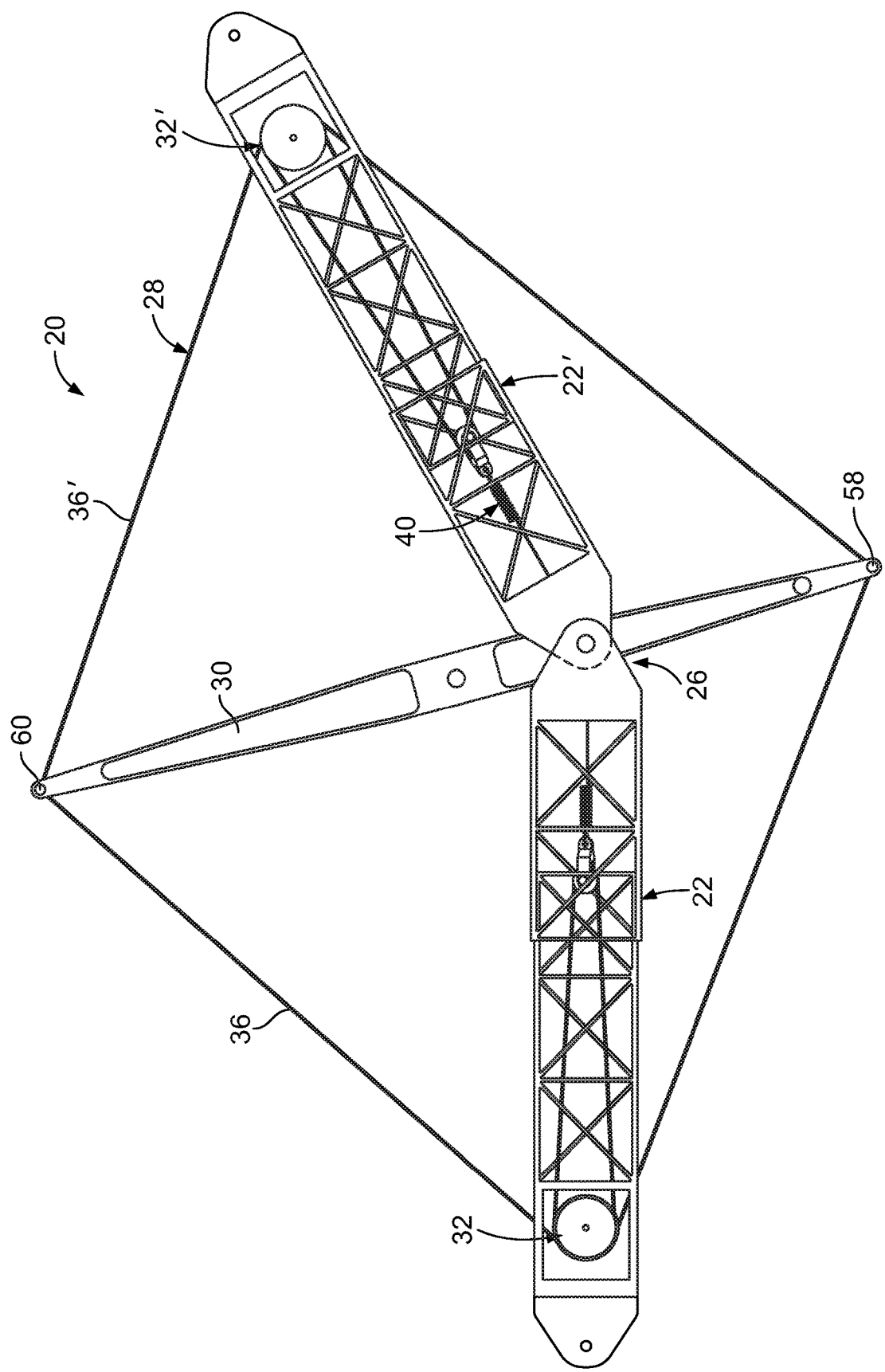
FIG. 19 is a side elevation view of the manipulator with the spreader arm in a shifted position.

The spreader arm 30 is capable of being repositioned along its length relative to the link arms 22, 22'. FIGS. 2-4 show the spreader arm 30 in a first, central position. FIG. 19 shows the spreader arm 30 in a second, shifted position wherein the spreader arm 30 has been repositioned from the central position.

Figure 18:
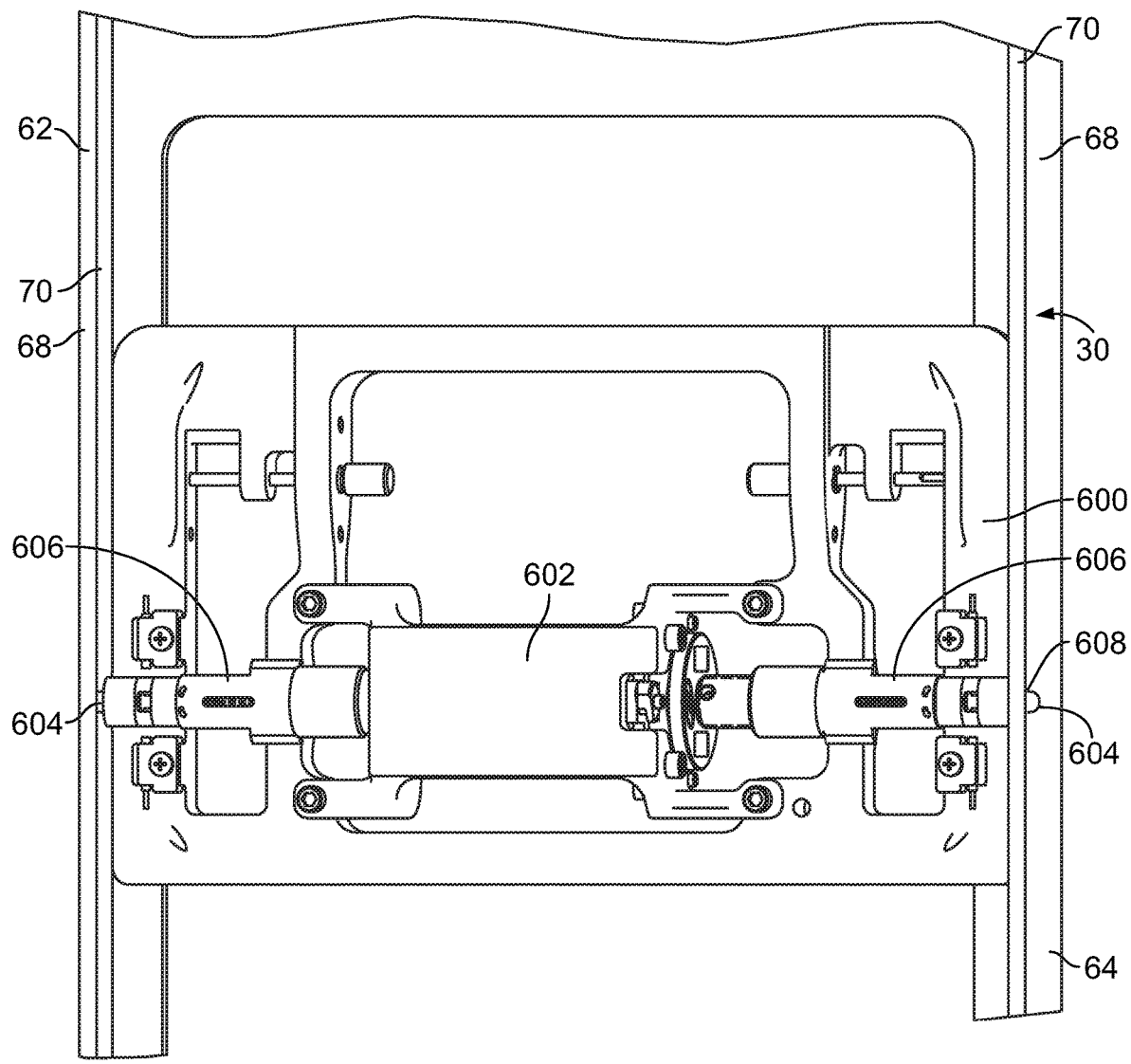
FIG. 18 is a perspective view of a first embodiment of a trolley for use in repositioning a spreader arm of the manipulator.

In a first embodiment as shown in FIG. 18, the hinge 26 between the link arms 22, 22' has a trolley 600 mounted thereon which is affixed to the hinge 26, but allows the hinge 26 to pivot or to articulate relative to the spreader arm 30. The trolley 600 slides along the side walls 62, 64 of the spreader arm 30.

The trolley 600 has a motor 602 which is capable of extending and retracting a pair of locking pins 604 relative to the side walls 62, 64 of the spreader arm 30. The locking pins 604 are spring loaded by spring cups 606. In this first embodiment, the spreader arm 30 has a plurality of spaced apart apertures 608 through the second wall 70 of each side wall 62, 64.

In a locked position, the locking pins 604 extend through one pair of the apertures 608 to fix the position of the spreader arm 30 relative to the trolley 600 and thus the link arms 22, 22'.

To cause the spreader arm 30 to slide to a new position, the motor 602 is actuated to retract the locking pins 604 out of the apertures 608. The driven element assemblies 32, 32'/232, 232'/332, 332'/432, 432' are actuated to articulate the link arms 22, 22' and relax the tension in one portion of each cable 36, 36', for example the upper portions 112, 112' of the cables 36, 36', and increasing the tension in the other portion of each cable 36, 36', for example the lower portion 110, 110' of each cable 36, 36'. Once this occurs, the spreader arm 30 will slide relative to the trolley 600 as pressure is applied to the end of the spreader arm 30 where the tension is increased. Thereafter, the motor 602 is actuated to spring load the locking pins 604 using the spring cups 606 such that the when a new aperture in the second wall 79 of the side walls 62, 64 of the spreader arm 30 is encountered, the locking pins 604 will automatically engage within the new apertures to fix the spreader arm 30 into the new position. This is a dynamic event; as the spreader arm 30 is moving, the hinge 26 is articulating.

Figure 20:
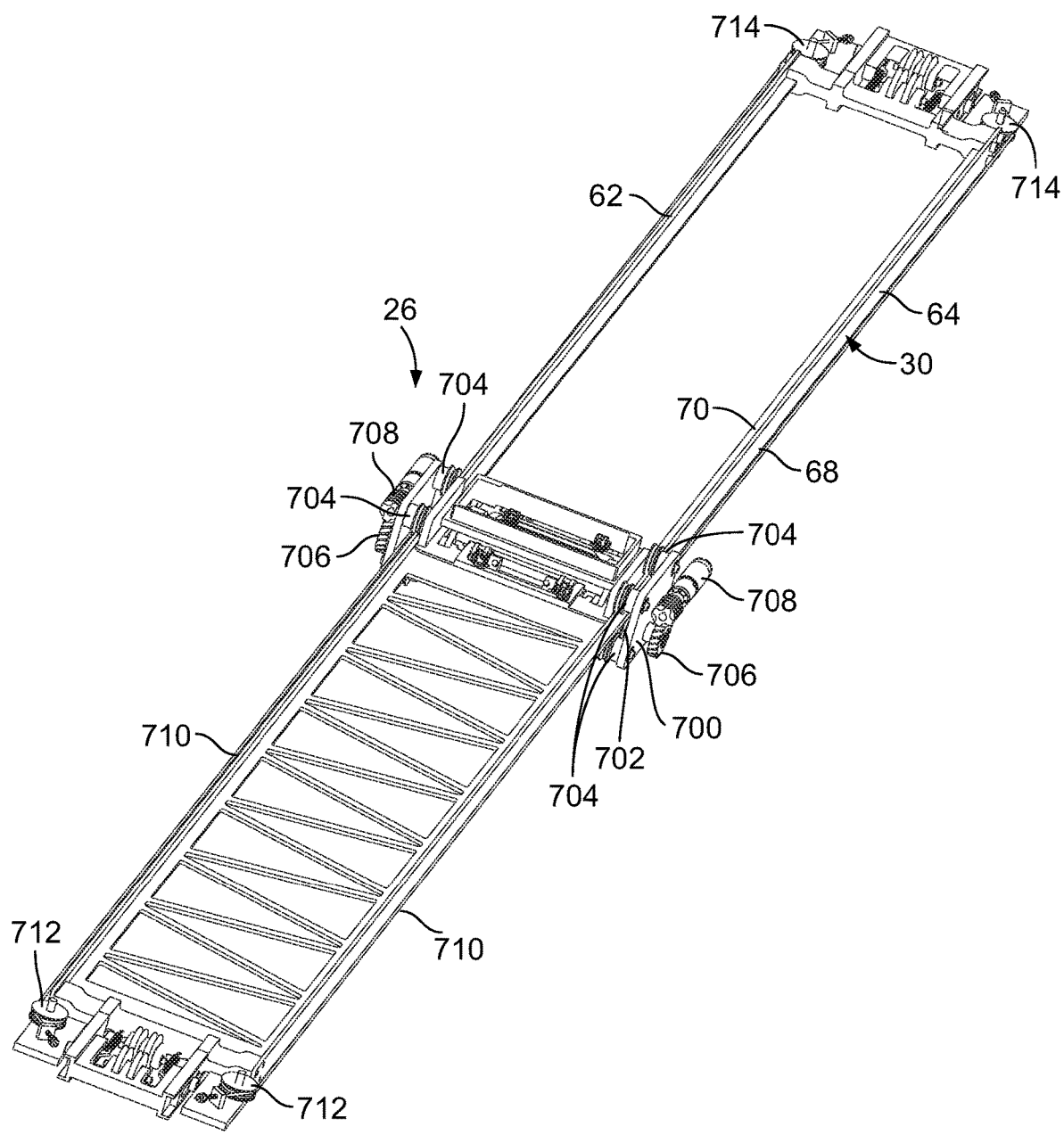
FIG. 20 is a perspective view of the spreader arm and a second embodiment of a trolley for use in repositioning the spreader arm.
Figure 21:
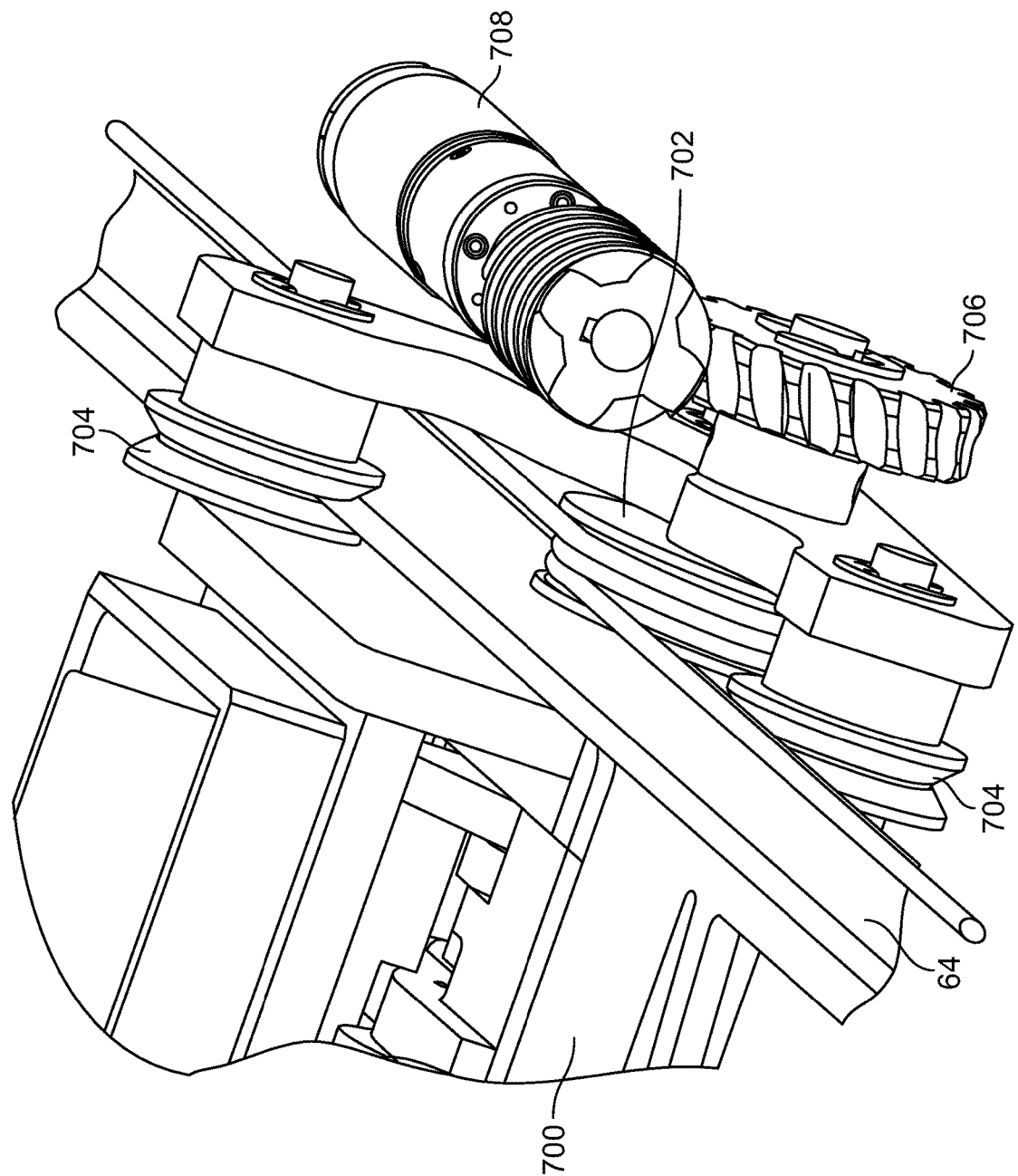
FIG. 21 is a perspective view of the components of the trolley of FIG. 20.

In a second embodiment as shown in FIGS. 20 and 21, the hinge 26 between the link arms 22, 22' has a trolley 700 mounted thereon which is affixed to the hinge 26, but allows the hinge 26 to pivot or to articulate relative to the spreader arm 30. The trolley 700 has a first capstan 702 proximate to the side wall 62 of the spreader arm 30, a second capstan (not shown) proximate to the side wall 64 of the spreader arm 30, and a plurality of guide rollers 704 which engage with the side walls 62, 64 of the spreader arm 30. The guide rollers 704 grip the side walls 62, 64 of the spreader arm 30 to attach the trolley 700 thereto. Each capstan 702 is driven by a toothed gear 706 and a motor 708. On each side of the spreader arm 30, a cable 710 extends from a drum 712 mounted at the first end 58 of the spreader arm 30, around the capstan 702, to a drum 714 mounted at the second end 60 of the spreader arm 30. In a locked position, the cables 710 are fixed in position relative to the trolley 700, which thus fixes the position of the spreader arm 30 relative to the trolley 700 and the link arms 22, 22'.

To cause the spreader arm 30 to move to a new position, the driven element assemblies 32, 32'/232, 232'/332, 332'/432, 432' are actuated to articulate the link arms 22, 22' and relax the tension in one portion of each cable 36, 36', for example the upper portions 112, 112' of the cables 36, 36', and increasing the tension in the other portion of each cable 36, 36', for example the lower portion 110, 110' of each cable 36, 36'. The motors 708 are then actuated to rotate the capstans 702. As the capstans 702 rotate, the cables 710 move past the trolley 700, thereby translating the spreader arm 30 relative to the link arms 22, 22'. When the spreader arm 30 reaches the new desired position, the motor 708 are stopped, thus stopping the movement of the cables 710 and the attached spreader arm 30. This is a dynamic event; as the spreader arm 30 is moving, the hinge 26 is articulating.

Figure 22:
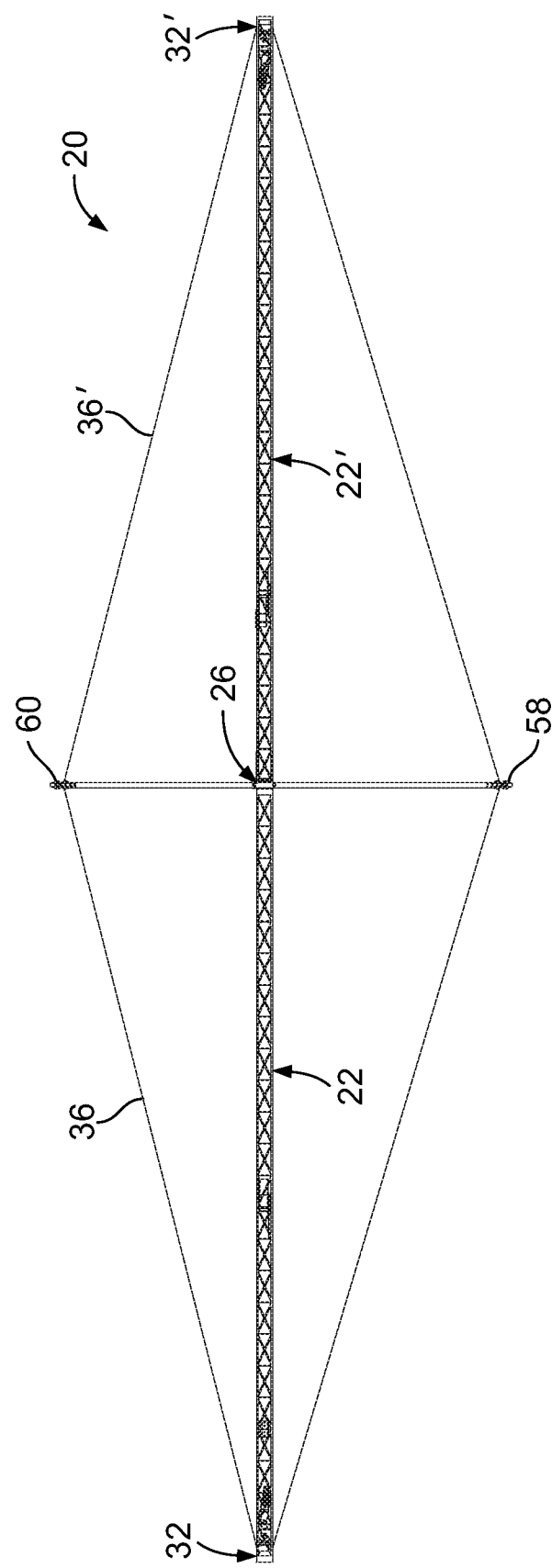
FIG. 22 is a side elevation view of the manipulator in a deployed state.
Figure 23:
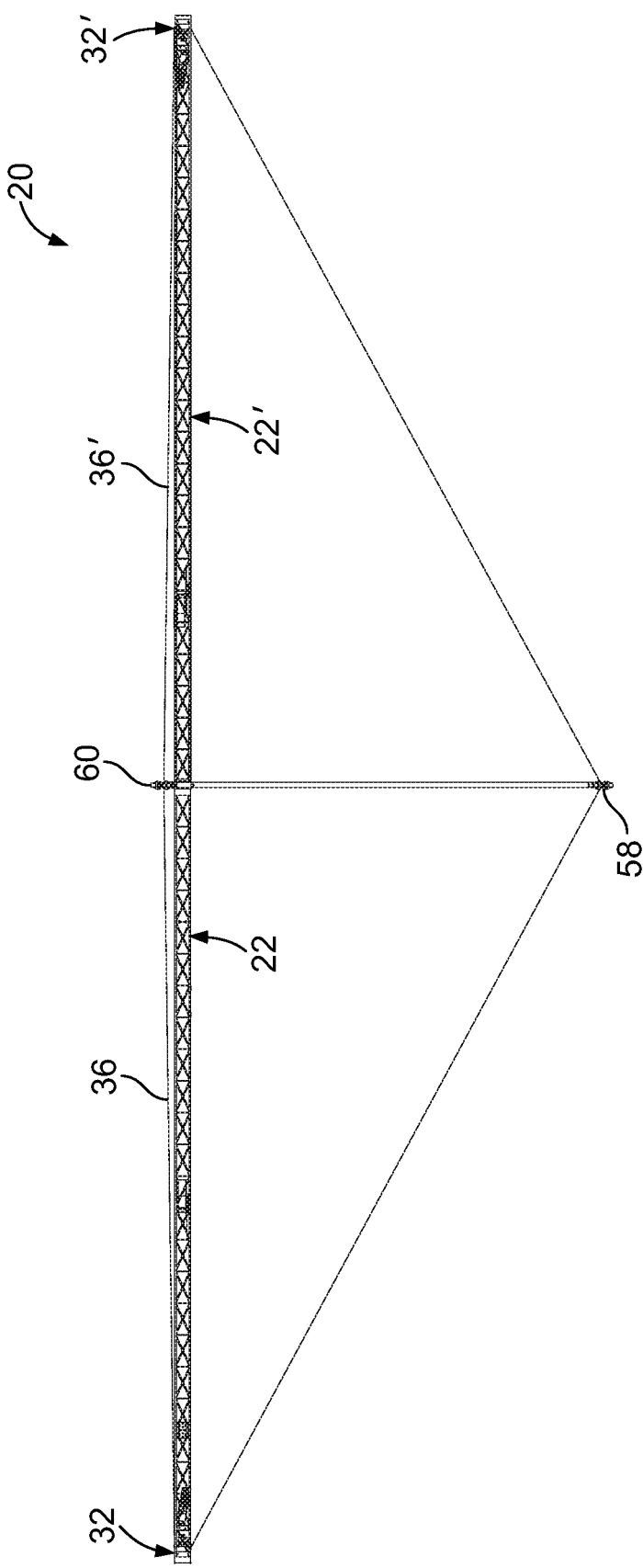
FIG. 23 is a side elevation view of the manipulator in an intermediate state.
Figure 24:
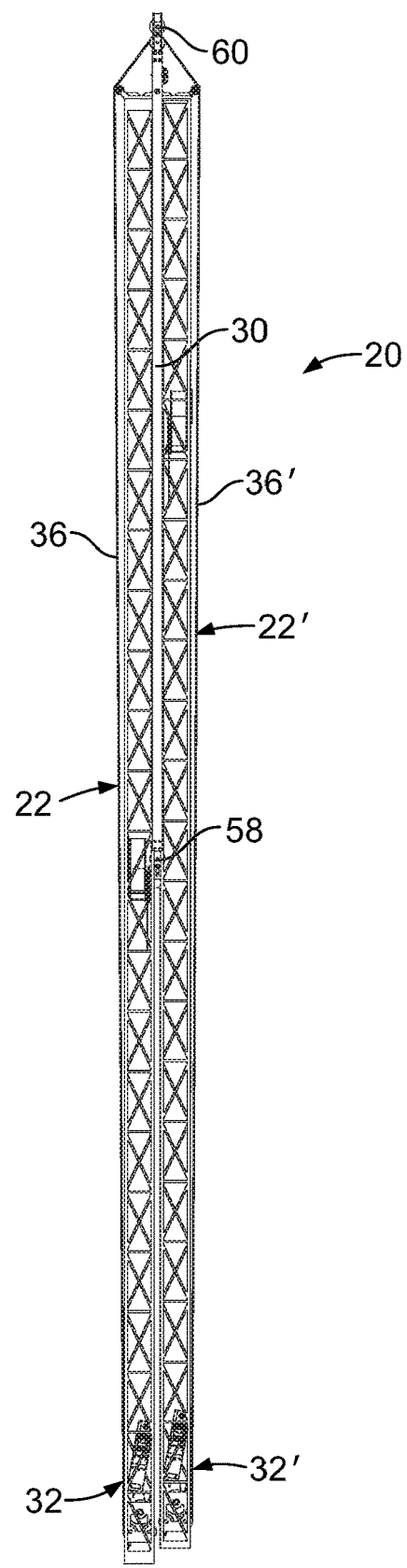
FIG. 24 is a side elevation view of the manipulator in a packaged state.

The manipulator 20 can be moved from the deployed state as shown in FIG. 22, to an intermediate state as shown in FIG. 23, to a packaged state as shown in FIG. 24 to take the manipulator 20 out of service. To effect this, the spreader arm 30 is slid so that the first or second end 58, 60 is proximate to the link arms 22, 22' as discussed above, thereby placing the manipulator 20 in the intermediate state shown in FIG. 23. After reaching the intermediate state of FIG. 23, the hinge 26 continues to articulate until the link arms 22, 22' are folded over onto each other, with the spreader arm 30 sandwiched in between in the packaged state as shown in FIG. 24.

The manipulator 20 can be moved from the packaged state as shown in FIG. 24, to an intermediate state as shown in FIG. 23, to a deployed state as shown in FIG. 22 for deployment into space. To effect this, the hinge 26 is articulated until the link arms 22, 22' are unfolded, with the spreader arm 30 extending between the link arms 22, 22' as shown in the intermediate state of FIG. 23. The spreader arm 30 is then slid relative to the link arms 22, 22' as discussed above, thereby placing the manipulator 20 in the deployed state shown in FIG. 22.

Figure 25:
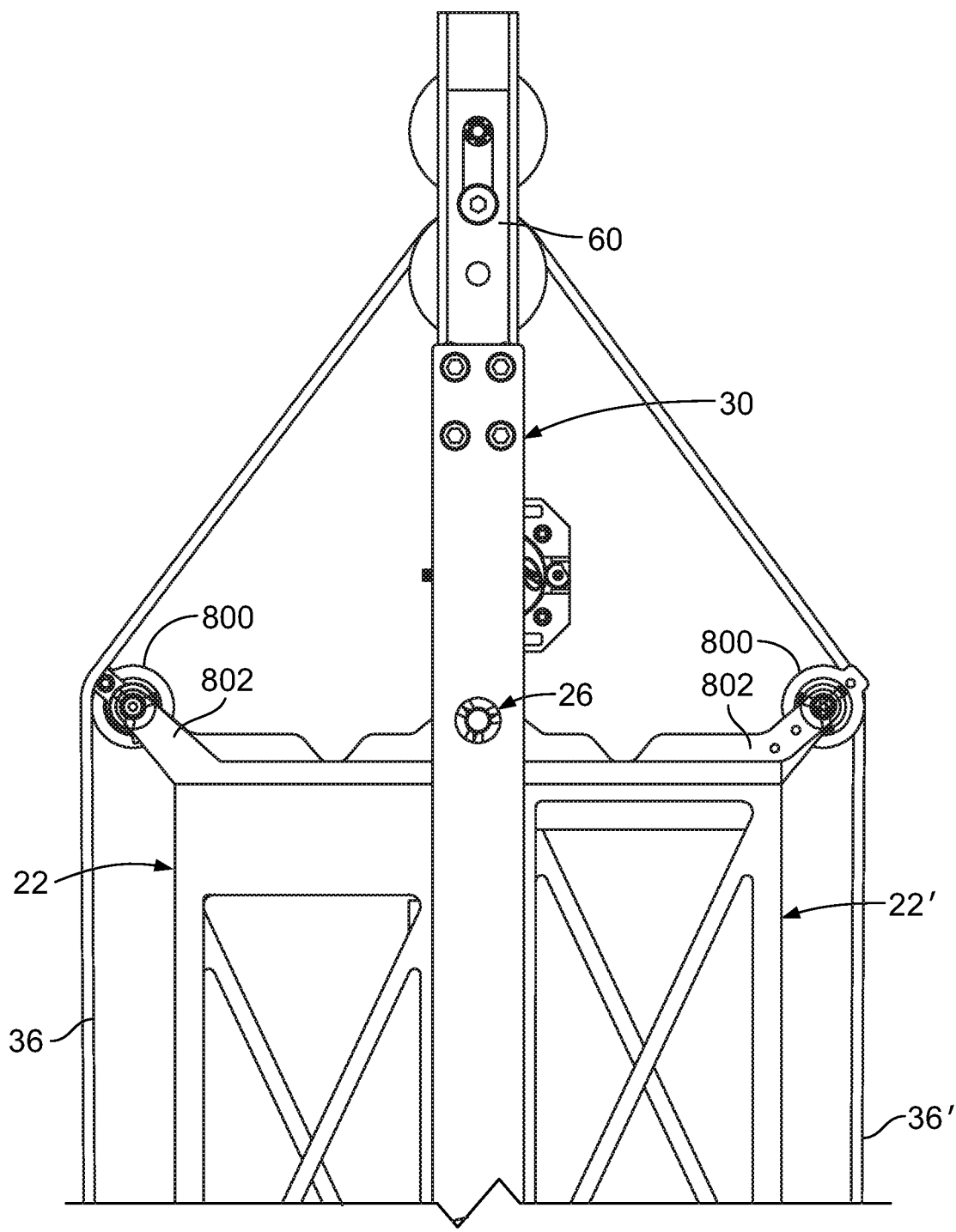
FIG. 25 is a side elevation view of a portion of the manipulator with link arms in the packaged state.

As shown in FIG. 25, the link arms 22, 22' may have guide rollers 800 mounted on their inner ends 42a which are offset from the hinge 26 axis by a frame 802. When the hinge 26 is articulating to move to the packaged state, the sections of the cables 36, 36' that are proximate to the hinge 26 contact the guide rollers 800. This provides a moment around the hinge 26 to assist in the rotation of the link arms 22, 22' from the packaged state to the extended state.

The manipulator 20 is, in general, a component assembly for use in a variety of larger assemblies that can perform robotic-like movements when acquiring and/or manipulating a payload. These larger assemblies utilizing manipulator 20 are ideally suited for in-space use or planetary installations as they are readily configurable for acquiring and precisely manipulating a payload. However, the present invention is not limited to these applications as it could also be used for Earth-based operations. The outer end 44b of the first link arm 22 is rigidly coupled to a stationary structure 1000, for example a spacecraft, a space station (stationary relative between the arms and the structure; the spacecraft or space station is not stationary relative to the planetary surface), planetary station, etc.; the second outboard end at the outermost arm (the arm furthest away from the stationary structure) has a tip 1002 which is free and serves as the mounting location for a payload holding device (not shown) (e.g., end effector, hook, grabber arm, bucket, scoop, platform, electromagnet, etc.) coupled thereto or incorporated therewith.

In the deployed state, if one or both of the link arms 22, 22' has been telescoped inward, extending the outer links 44 is accomplished by reacting against a temporary anchorage 1004 as shown in FIG. 26, or by swinging the manipulator 20 to generate sufficient outward dynamically induced force to allow the links to be released and then re-engaged in the extended position. FIG. 26 depicts one of many possible maneuvers to extend the link L, the link between the distal joint D and the wrist W, using an anchor location 1004 at the tip 1002. In this example, the wrist W connects to the temporary anchor location 1004 and then the proximal joint P rotates clockwise while the distal joint D rotates counter clockwise as shown, which extends the last link.

In addition, the link arms 22, 22' may have a motor (not shown) mounted on one of the sections, for example the inner section 42, 42', and a threaded shaft (not shown) extends outwardly therefrom and is rotated by motor. The other section, for example the outer section 44, 44' has a threaded nut (not shown) mounted thereon through which the shaft is mounted. When the motor is actuated, the shaft rotates relative to the nut. This causes the sections 42, 44/42', 44' to telescope. Depending upon which way the shaft is rotated, the outer section 44, 44' is pushed outwardly from the inner section 42 and the hinge 26 to extend the link arm 22, 22', or the outer section 44, 44' is pulled inwardly into the inner section 42 and toward the hinge 26 to retract the link arm 22, 22'. If such a motor and nut are provided, the motor and nut are actuated when the driven element assemblies 32, 32'/232, 232'/332, 332'/432, 432' are actuated as described herein. If such a motor and nut are provided, the latches 52, 52' can be eliminated.

Likewise, the spreader arm 30 may have a motor (not shown) mounted thereon and a nut (not shown) mounted on the hinge 26 (or the motor mounted on the hinge 26 and the nut mounted on the spreader arm 30) to cause the spreader arm 30 to move relative to the hinge 26. When the motor is actuated, the motor shaft rotates relative to the nut. This causes the spreader arm 30 to move relative to the hinge 26. Depending upon which way the shaft is rotated, the spreader arm 30 moves upwardly or downwardly relative to the hinge. If such a motor and nut are provided, the motor and nut are actuated when the driven element assemblies 32, 32'/232, 232'/332, 332'/432, 432' are actuated as described herein. If such a motor and nut are provided, the latches 52, 52' can be eliminated.

In each embodiment, while tensioning by cables 36, 36' are shown and described herein, it is to be understood that the term cable includes ropes, tapes, etc. or some combination of these approaches.

In each embodiment, while the cables 36, 36' are described as being attached to the ends 58, 60 of the spreader arm, it is to be understood that the term "end" as used with regard to reference numerals 58 and 60 does not require that the cables 36, 36' be attached to the outermost point of the spreader arm 30. That is to say, the term "end" as used with regard to reference numerals 58 and 60 encompasses the outermost point of the spreader arm 30 and also positions spaced from the outermost point of the spreader arm 30.

In each embodiment, actuating the hinges 26 of the manipulator 20 through the cable actuation and tensioning system 28 provides a large mechanical advantage for the motor 48 that actuates the hinge 26, enabling use of smaller, lighter-weight motors, thus requiring less power. Low precision motors can be used because the cable actuation and tensioning system 28 can be designed to damp out irregularities in the motor torque, further reducing motor complexity and costs. The cable actuation and tensioning system 28 increases the stiffness of the link arms 22, 22', providing for a smaller, lighter-weight system.

While preferred embodiments of the present invention are shown and described, it is envisioned that those skilled in the art may devise various modifications of the present invention without departing from the spirit and scope of the appended claims.

What is claimed is:

1. A manipulator comprising:
    first and second arms connected together by a hinge which allows the first and second arms to rotate relative to each other;
    a third arm connected to and extending from the first and second arms,
    wherein at least one of the arms comprises an inner section and an outer section and the outer section is configured to move relative to the inner section to lengthen or shorten the arm;
    a first driven element attached to one of the arms;
    a first cable engaged with the first driven element and attached to the other two arms;
    a second driven element attached to one of the arms;
    a second cable engaged with the second driven element and attached to the other two arms;
    wherein movement of the first driven element moves the first cable and causes the movement of the outer section relative to the inner section.

2. The manipulator of claim 1, wherein:
    the at least one of the arms is the first arm; and
    the second arm comprises an inner section and an outer section and the outer section of the second arm is configured to move relative to the inner section of the second arm to lengthen or shorten the second arm.

3. The manipulator of claim 1, wherein the third arm comprises an inner section and a pair of outer sections and the outer sections are configured to move relative to the inner section to lengthen or shorten the third arm.

4. The manipulator of claim 1, wherein each of the first and second arms comprises an inner section and an outer section and the outer section is configured to move relative to the inner section to lengthen or shorten the first and second arms, and the third arm comprises an inner section and a pair of outer sections and the outer sections are configured to move relative to the inner section to lengthen or shorten the third arm.

5. The manipulator of claim 1, further comprising a latch provided between the inner and outer sections, the latch configured to be disengaged to allow the movement of the outer section relative to the inner section and configured to be engaged to prevent the movement of the outer section relative to the inner section.

6. The manipulator of claim 1, wherein the first cable is continuous and is attached to the other two arms by pulleys, and the second cable is continuous and is attached to the other two anus by pulleys.

7. The manipulator of claim 1, wherein opposite ends of the first cable are affixed to the other two arms, and opposite ends of the second cable are affixed to the other two arms.

8. The manipulator of claim 1, further comprising
    first and second pulleys mounted between the first and second driven elements, and at least one tension spring mounted between the pulleys.

9. The manipulator of claim 8, further comprising at least one tether attached to the at least one tension spring and between the first and second pulleys.

10. The manipulator of claim 8, further comprising at lent one tether attached to the at least one tension spring and attached to the hinge or to one of the link arms.

11. The manipulator of claim 1, wherein at least one of the first and second driven elements is a pair of capstans, each capstan being driven by a motor.

12. The manipulator of claim 11, herein the capstans are mounted on a common shaft.

13. The manipulator of claim 11, wherein the capstans are mounted on separate shafts, and the capstans are angled relative to a centerline of the arm.

14. The manipulator of claim 1, wherein at least one of first and second driven elements is a pair of differential capstans, each differential capstan comprising a pair of capstans, each pair of differential capstans being driven by a motor.

15. The manipulator of claim 14, wherein the differential capstans are mounted on a common shaft.

16. The manipulator of claim 14, wherein the differential capstans are mounted on separate shafts.

17. The manipulator of claim 1, further comprising a plurality of moveable pulleys mounted to at least one of the link arms which engage the first cable and are configured to be moved along a length thereof, and a plurality of pulleys mounted to at least one of the arms which engage the second cable and are configured to he moved along a length thereof.

18. A manipulator comprising:
    first and second link arms;
    a hinge attaching the first link arm to the second link arm and configured to allow the link arms to rotate relative to each other; and
    a spreader arm attached to the first and second link arms and configured to slide relative to the first and second link arms to change a position of the spreader arm relative to the first and second link arms; and
    at least one cable and at least one driven element attached to the arms and configured to affect the rotation of the first and second link arms relative to each other.

19. The manipulator of claim 18, wherein the hinge includes a trolley having a retractable pin, and wherein the spreader arm includes at least two apertures into which the pin can be seated, the spreader arm being moveable relative to the trolley and pins.

20. The manipulator of claim 18, wherein the hinge includes a trolley having a driven capstan thereon, and wherein the spreader arm includes a cable attached to the ends thereof and to the capstan, wherein movement of the capstan causes the sliding movement of the spreader arm relative to the hinge.

21. A manipulator comprising:
- first and second arms connected together by a hinge which allows the first and second arms to rotate relative to each other;
- a third arm connected to and extending from the first and second arms,
- wherein at least one of the arms comprises an inner section and an outer section and the outer section is configured to move relative to the inner section to lengthen or shorten the arm;
- a first driven element attached to one of the arms;
- a first cable engaged with the first driven element and attached to the other two arms;
- a second driven element attached to one of the arms;
- a second cable engaged with the second driven element and attached to the other two arms;
- wherein movement of the first driven element moves the first cable and causes the movement of the outer section relative to the inner section.

\* \* \* \* \*